US012233573B2

(12) United States Patent
Slager, III

(10) Patent No.: US 12,233,573 B2
(45) Date of Patent: Feb. 25, 2025

(54) CONCRETE RESIDUE COLLECTION SYSTEM FOR CONCRETE MIXING TRUCKS

(71) Applicant: William Slager, III, Oak Forest, IL (US)

(72) Inventor: William Slager, III, Oak Forest, IL (US)

( * ) Notice: Subject to any disclaimer, the term of this patent is extended or adjusted under 35 U.S.C. 154(b) by 573 days.

(21) Appl. No.: 17/665,512

(22) Filed: Feb. 5, 2022

(65) Prior Publication Data

US 2022/0250280 A1 Aug. 11, 2022

Related U.S. Application Data

(60) Provisional application No. 63/146,678, filed on Feb. 7, 2021.

(51) Int. Cl.
*B28C 5/42* (2006.01)

(52) U.S. Cl.
CPC .......... *B28C 5/4237* (2013.01); *B28C 5/4213* (2013.01); *B28C 5/4248* (2013.01); *B28C 5/4258* (2013.01)

(58) Field of Classification Search
CPC ............................ B28C 5/4237; B28C 5/4241
USPC ...................................................... 366/35, 38
See application file for complete search history.

(56) References Cited

U.S. PATENT DOCUMENTS

| | | | | |
|---|---|---|---|---|
| 4,226,542 | A | 10/1980 | Black et al. | |
| 6,354,439 | B1 | 3/2002 | Arbore | |
| 7,594,524 | B2 * | 9/2009 | DeCollibus | B28C 7/16 141/89 |
| 2002/0092799 | A1 * | 7/2002 | Storruste | B07B 1/24 209/458 |
| 2011/0197980 | A1 | 8/2011 | Sullivan et al. | |

FOREIGN PATENT DOCUMENTS

| | | | |
|---|---|---|---|
| FR | 3040315 | A1 | 3/2017 |
| WO | 2012017444 | A1 | 2/2012 |

* cited by examiner

*Primary Examiner* — David L Sorkin
(74) *Attorney, Agent, or Firm* — Bold IP PLLC; Houda El-Jarrah

(57) ABSTRACT

The present invention relates to a new method and system for reclaiming and recycling the concrete residue that remains on key components of a concrete mixing truck in a safe and environmentally responsible manner. Any slurry aggregate remaining on the chutes or other parts of the concrete mixing truck is collected by a concrete collection system that is attached to the concrete mixing truck and includes an augur conveyor enclosed in a housing, whereby the augur conveyor is hydraulically extended either behind or in front of the chutes of the concrete mixing truck depending on a type of mixing truck. The augur conveyor can be raised to a maximum height in order to discharge any collected slurry aggregate from the chutes or other parts of the truck back into a top hopper of the concrete truck to be directed back into the mixing drum of the concrete mixing truck.

9 Claims, 21 Drawing Sheets

CONCRETE RESIDUE COLLECTION SYSTEM FOR CONCRETE MIXING TRUCKS

CROSS-REFERENCE TO RELATED APPLICATIONS

This application is a non-provisional application which claims priority to U.S. Provisional Patent Application No. 63/146,678 filed on Feb. 7, 2021, which is incorporated by reference in its entirety.

FIELD OF THE DISCLOSURE

The present invention relates to a new method and system for reclaiming and recycling the concrete residue that remains on one or more key components of a concrete mixing truck, such as the top hopper, primary pouring chute, and any auxiliary attached chutes, in a safe and environmentally responsible manner. More specifically, any slurry aggregate remaining on these components of the concrete mixing truck are returned to the mixing drum of the concrete mixing truck via the inventive system described in the present description and can be transported from a delivery site to another site where the slurry aggregate may be disposed of in an environmentally responsible manner.

BACKGROUND

Concrete is usually delivered from a production site to various delivery sites for construction and building purposes in a concrete mixing truck. The concrete mixing trucks typically include a rotating mixing drum that is supported on a truck cab and chassis or trailer frame on wheels. The concrete mixing truck further includes a primary pouring chute and a top hopper that serve to feed the mixed form of concrete from the rotating mixing drum and onto the pouring chutes and then to a designated area at a delivery site.

A concrete mixing truck usually has a primary pouring chute that is fixedly attached to the concrete mixing truck, whereby a top portion of the chute is attached to a lower portion of the chute and the lower portion of the chute can be folded during transport and extended when the primary chute is in use. There are usually also many other additional or auxiliary chutes located on a concrete mixing truck in case the primary pouring chute is too short and additional length needs to be added to the primary chute to deliver the concrete. The auxiliary chutes attach in segments to the primary pouring chute until the desired length is achieved.

Once the mixed concrete has been delivered to the delivery site, a big problem remains. When the concrete is delivered, a considerable amount of concrete residue in the form of liquid and solids remains on the pouring chutes, including the primary pouring chutes and any additional attachable pouring chutes transported on the concrete mixing truck and connected to the primary pouring chute. Accordingly, after the concrete is delivered, the driver or operator of the concrete mixing truck has to wash off any concrete residue that remains in the top hopper and on the pouring chutes before this concrete residue hardens. It is imperative that the operator or driver of the concrete mixing truck washes any concrete residue as quickly and as thoroughly as possible from the top hopper, the primary pouring chute, and any additional chutes used in operation as soon as possible after delivery of the concrete because the concrete will harden very quickly on the chutes and cause mechanical difficulty and failures to the concrete mixing truck. Further, it is a hazard to surrounding people and vehicles if the slurry aggregate is not cleaned off thoroughly, because when the driver is driving the concrete mixing truck, one or more pieces of the solids of the slurry aggregate can fly off and hit windshields or other elements causing material damage to surrounding vehicles, humans, and other surrounding elements. To clean the top hopper and attached chutes on the concrete mixing truck, most concrete mixing trucks are already equipped with their own water storage tank system and hoses that can be used by the operator or driver of the concrete mixing truck to wash the top hopper and pouring chutes of any remaining concrete residue.

Concrete mixtures, including the kind delivered by concrete mixing trucks, are well known to be toxic, caustic, and corrosive. If allowed to penetrate the ground water or any other body of water or to soil, the environment is affected in a harmful and negative manner. The Environmental Protection Agency (EPA) enforces the many laws against unlawful dumping of concrete which has harmful and damaging effects on the environment and welfare of a surrounding community. If concrete and slurry aggregate is dumped into the groundwater or other body of water or left at a job site in an improper way, companies can face very expensive and costly penalties and sanctions. There are various established methods of handling concrete washout which includes concrete and slurry aggregate from a concrete mixing truck, which as further elaborated upon below, are still inadequate and lacking.

Typically, job sites or delivery sites may include what are referred to as "concrete washout areas." Concrete washout areas are designated areas on a job site where concrete washout (such as the washout from the top hopper and pouring chutes of a concrete mixing truck) may be disposed. A concrete washout area must be set up in a manner that does not contribute pollutants to surface waters or stormwater runoff or other bodies of water. Typically, concrete washout areas include lined excavated pits in the ground, commercially manufactured prefabricated washout containers, or aboveground holding areas constructed of berms, sandbags or straw bales with a plastic liner. Currently, the customer or management at a job site must pay for the removal of the concrete washout containers, which is expensive to the customer or client and time consuming. Further, there are too many instances of concrete waste or washout being improperly disposed of, which is a hazard to the health of the community and to the environment.

U.S. Pat. No. 6,354,439 is an example of a system for collecting concrete slurry washed from a primary pouring chute of a concrete mixing truck and redirecting the slurry into the mixing drum. Notably, the system described in this patent is deficient because the system does not collect all of the slurry aggregate left on the primary chute. Rather, the system described in U.S. Pat. No. 6,354,439 solely collects the slurry, which is liquid effluent, and does not redirect the solid particles or slurry aggregate back into the mixing drum. The solids left over still have to be transported and disposed of separately. Further, the system described in U.S. Pat. No. 6,354,439 only partially cleans the primary chute of slurry, but notably does not remove the slurry aggregate or anything from the additional attachment chutes that may be used during delivery of the original load of concrete. Thus, there are many additional deficiencies not addressed by this system described in U.S. Pat. No. 6,354,439. Other patents describe straining the slurry aggregate using various strainers and then hauling the strained effluent in a separate container and/or the solids, but these patents still do not offer a desirable, complete reclamation solution.

Accordingly, there is a need for an improvement and alternatives to the existing solutions for removing and transporting concrete residue that remains in a top hopper or pouring chutes of a concrete mixing truck, including any slurry aggregate, which includes the larger solids left behind as well as the liquid effluent of the concrete waste.

SUMMARY

One or more non-limiting embodiments of the present description are directed to a novel and unique method for collecting slurry aggregate from a concrete mixing truck using a concrete residue collection system. The method may include extending the concrete residue collection system from a stored position to an extended position beneath any utilized pouring chutes of the concrete mixing truck. The concrete residue collection system may further comprise a collection hopper and an augur conveyor. The augur conveyor may be connected to the collection hopper and may further comprise a casing tube having an augur conveyor inlet and an augur conveyor outlet. The augur conveyor may further include a helical screw disposed within the casing tube of the augur conveyor, whereby the helical screw extends from the augur conveyor inlet to the augur conveyor outlet, whereby an outlet of the collection hopper leads to at least the augur conveyor within the casing tube. The concrete residue collection system further includes an extension platform, whereby the collection hopper and connected augur conveyor are attached to the extension platform. One or more hydraulic cylinders connect the casing tube of the augur conveyor and the extension platform. The concrete residue collection system may further include a motor housing that houses a motor.

The method may further include, when the operator of the mixing truck is ready for operation and reclamation of the slurry aggregate by the concrete residue collection system, extending the extension platform in a horizontal direction away from the concrete mixing truck and raising the casing tube of the augur conveyor to a full height until the casing tube of the augur conveyor is raised to a maximum angle away from the extension platform and the augur conveyor outlet is positioned over a top hopper of the concrete mixing truck. The method may further include powering the helical screw to rotate within the casing tube of the augur conveyor in order to have a rotating helical screw within the casing tube that extends from the augur conveyor inlet to the augur conveyor outlet. Next, the method may include activating a water source and flushing any slurry aggregate collected on the any utilized pouring chutes of the concrete mixing truck into the collection hopper of the concrete residue collection system, whereby the slurry aggregate flowing off of the any utilized pouring chutes is directed through an interior cavity of the collection hopper and into the augur conveyor inlet located on a lower end of the casing tube. The method may further include flowing the slurry aggregate in an upwards direction upwardly through the casing tube by means of the rotating helical screw within the casing tube of the augur conveyor towards the augur conveyor outlet. Next, the method may include discharging the slurry aggregate from the augur conveyor outlet through a connected discharge pipe or tube or other discharge assembly into an inlet of a top hopper of the concrete mixing truck and flowing the slurry aggregate from the connected discharge pipe or tube or discharge assembly into the inlet of the top hopper of the concrete mixing truck and into the mixing drum of the concrete mixing truck.

Upon completion of reclamation of the slurry aggregate within the mixing drum of the concrete mixing truck, the method may include preparing the concrete residue collection system to return to the stored position, further comprising, lowering the casing tube of the augur conveyor until the casing tube is substantially horizontal and parallel to and/or contacting a top surface of the extension platform. After lowering the casing tube of the augur conveyor, the method may include retracting the extended extension platform by retracting the extended extension platform in a horizontal direction towards the concrete mixing truck. Once the slurry aggregate is in the mixing drum and collected from the top hopper and any utilized pouring chutes of the mixing truck, the method may include transporting the slurry aggregate on the concrete mixing truck to another location for subsequent disposal or use. In one embodiment, the slurry aggregate may be transported from the delivery site (customer) to the production site (original source of concrete provided to the customer).

In another aspect, the method may further include extending the concrete residue collection system so that the collection hopper attached to the extension platform is positioned beneath a lowermost chute of the any utilized pouring chutes and the casing tube of the augur conveyor is fully raised such that the augur conveyor outlet and connected discharge pipe or tube or discharge assembly are positioned over an inlet of the top hopper of the concrete mixing truck. In another aspect, any utilized pouring chutes may comprise a primary chute and any auxiliary chutes that are separately attachable to the primary chute.

In another aspect, extending the concrete residue collection system further comprises extending the concrete residue collection system to extend out of an opening of a protective housing that houses the concrete residue collection system in the stored position, wherein the protective housing is attached to a frame assembly of the concrete mixing truck.

In another aspect, the discharge assembly may further have a stored position and a fully extended position, whereby extending the discharge assembly coupled to the augur conveyor to a fully extended position further comprises: activating a hydraulic cylinder coupled to an articulating half pipe and cam, whereby the cam is positioned within a slot within a slot and cam housing, whereby the slot and cam housing is attached to an underside of the casing tube of the augur conveyor near an upper end of the casing tube. Upon activation of the hydraulic cylinder, the method may include moving the cam in an upwards direction through the slot of the slot and cam housing, thereby moving the articulating half pipe in an upwards direction towards a fixed half pipe connected an upper end of the slot and cam housing. When the cam reaches a final stop position at the upper end of the slot and cam housing, the method may include positioning the articulating half pipe such that a top end of the articulating half pipe contacts a lower end of the fixed half pipe, whereby any slurry aggregate discharged from the augur conveyor outlet via the helical screw that can rotate is discharged into the fixed half pipe and connected articulating half pipe into the inlet of the top hopper and then into the mixing drum.

In a non-limiting embodiment, the concrete mixing truck is a rear discharge mixing truck, whereby when in use to collect the slurry aggregate, the concrete residue collection system is extended behind a rear of the rear discharge mixing truck when in an extended position. In other embodiments, the concrete residue collection system may also be utilized for a forward discharge mixing truck, whereby when in use to collect the slurry aggregate, the concrete residue collection system is extended in front of a cab of the concrete mixing truck and in front of the forward discharge mixing truck when in an extended position.

In a non-limiting embodiment, the one or more hydraulic cylinders connecting the casing tube of the augur conveyor to the extension platform is hydraulically powered using water from a hydraulic system included on the concrete mixing truck.

In a non-limiting embodiment, the extension platform may comprise one or more telescoping bars that telescopically extend and retract.

Further, in a non-limiting embodiment, the augur conveyor inlet leads to an entrance of the casing tube that leads to a starting point of the helical screw. Further, the augur conveyor outlet of the helical screw leads to an attached connected pipe or tube or discharge assembly.

In a non-limiting embodiment, the concrete residue collection system is attached to a frame of a concrete mixing truck, whereby the concrete mixing truck may include a cab, a mixing drum, a hydraulic water supply system, a top hopper, and at least a primary pouring chute, whereby the primary pouring chute is positioned beneath the top hopper and is configured to receive contents from an outlet of the top hopper. One or more additional auxiliary chutes may be attached to the lower end of the primary pouring chute if needed to extend a length of the primary pouring chute to deliver the concrete from the mixing drum of the concrete mixing truck to a delivery site.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description is drawn to an innovative concrete residue collection system that can be used to direct any concrete residue left behind in a top hopper and on pouring chutes of a concrete mixing truck back into the mixing drum of the concrete mixing truck so that the collected slurry aggregate can be disposed of in a safe, environmentally responsible manner by the concrete supplier (or another related party) rather than being left at a concrete delivery site and job site.

The present invention allows the operator of the concrete mixing truck to quickly and easily redirect the concrete residue back into the mixing drum of the concrete mixing truck rather than washing off the concrete residue and leaving in a designated concrete washout area at a job site. As noted above, conventional methods for dealing with any remaining concrete residue place the burden and responsibility on the customer to handle the proper removal of the concrete washout area, which adds a great deal of expense and responsibility to the management of the job site who must have the concrete washout from a concrete mixing truck hauled away and disposed of properly. Further, if disposed of improperly by the customer, there are long lasting harmful effects on the environment and health of the individuals in the surrounding community. Accordingly, the present description provides multiple embodiments for an augur conveyor that makes up a larger concrete residue collection system that can be employed on either a rear discharge type of concrete mixing truck or a front discharge type of concrete mixing truck. Further details are provided below with respect to the Figures.

Figure 1:
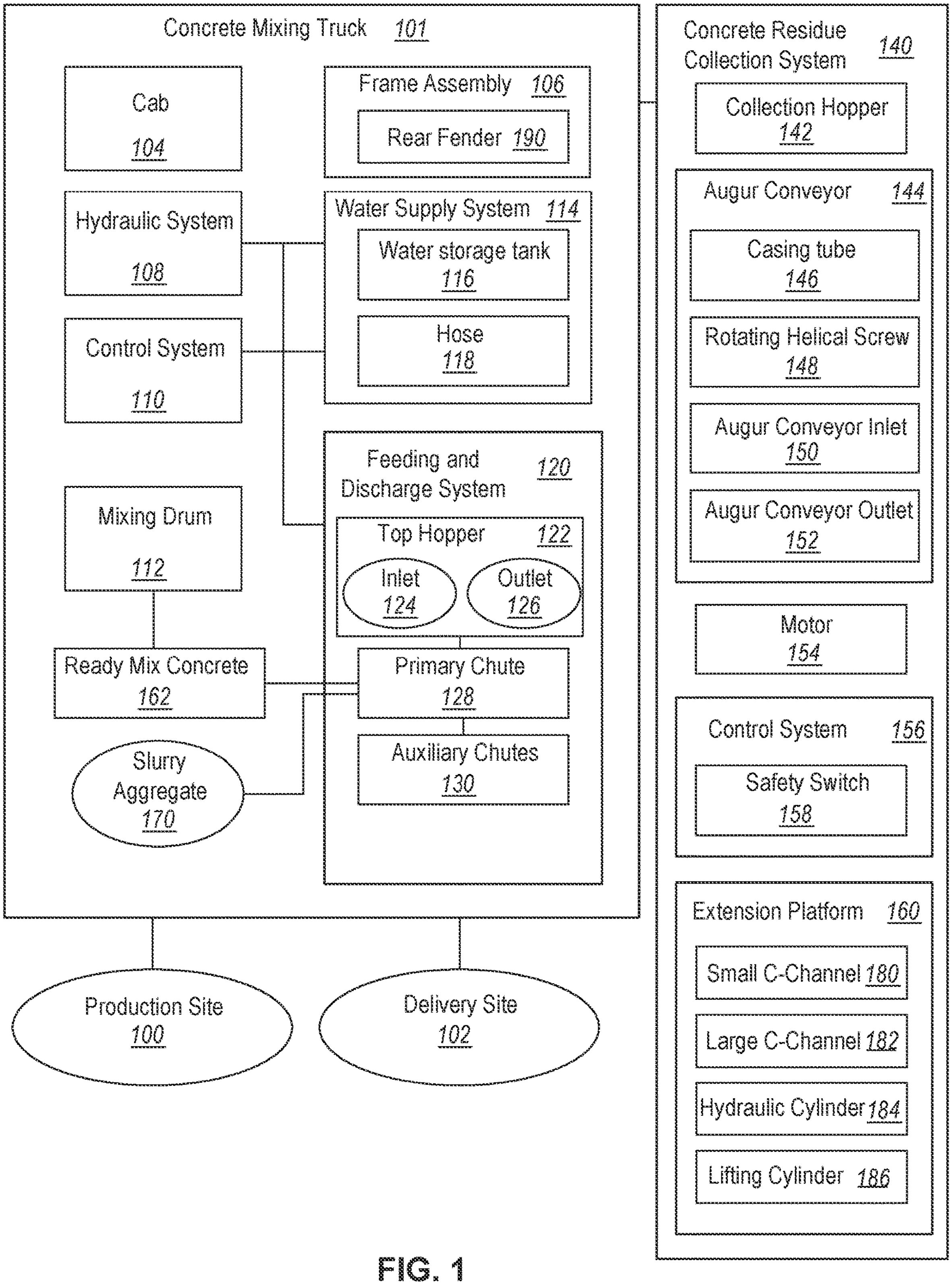
FIG. 1 is a block diagram of a system for cleaning and reclaiming slurry aggregate residue on a concrete mixing truck using an integrated concrete residue collection system.

FIG. 1 is a block diagram of an exemplary concrete residue collection system, such as concrete residue collection system 140, that can be implemented and integrated on a concrete mixing truck, such as concrete mixing truck 101. Concrete mixing truck 101 is a mixing truck capable of storing cement and other elements that are mixed together to form concrete. As known by one of ordinary skill in the art, cement and concrete are not necessarily synonymous. Technically, concrete is a mixture of pastes and aggregates or rocks. The paste used to form the concrete is a mixture of cement and water as well as other elements.

In one or more non-limiting embodiments, concrete mixing truck 101 is configured to deliver concrete 162 to a delivery site 102. The concrete mixing truck 101 may be configured to receive the initial loads of concrete 162 from the concrete production site 100 and then to transport the initial loads of concrete 162 to the delivery site 102. The delivery site 102 is usually also the same as a job site where concrete 162 is used in construction or building or other types of work.

The concrete mixing truck 101 may include a cab 104, which as known in the art, may be a driver compartment of the concrete mixing truck 101. The concrete mixing truck 101 may further include a frame assembly 106 that connects the cab 104 to the wheels of the concrete mixing truck 101, such as wheels 406 shown in FIG. 4 and wheels 702 shown in FIG. 7. Further, the frame assembly 106 supports all of the components and systems of the concrete mixing truck 101.

The concrete mixing truck 101 is well known for having a rotating mixing drum 112. The rotating mixing drum 112 contains the initial loads of concrete 162 and keeps the concrete 162 in liquid form to prevent fully hardening while the concrete 162 is in transport to a delivery site 102, whereby the mixing drum 112 rotates continuously even when the concrete mixing truck 101 is moving or parked unless the mixing drum 112 is specifically stopped by the operator of the concrete mixing truck 101.

The concrete mixing truck 101 may further include a hydraulic system 108 which has one or more hydraulic motors and pumps to operate the various electromechanical elements of the concrete mixing truck 101 as known in the art. Further, the hydraulic system 108 may operate in conjunction with the water supply system 114 of the concrete mixing truck 101. The water supply system 114 on the concrete mixing truck 101 may include one or more water storage tanks 116. The water storage tank 116 includes a reservoir of water that is used for various processes and methods on the concrete mixing truck 101, including for use with mixing the concrete 162 in the mixing drum 112. The water storage tank 116 holds enough water to also clean the pouring chutes of the concrete mixing truck 101, including the primary chute 128 and any auxiliary chutes 130.

Conventionally, the concrete mixing trucks 101 includes one or more hoses 118 attached to one or more areas of the frame assembly 106 and/or stored on the concrete mixing truck 101 that connect to the water supply system 114. The operator or driver of the concrete mixing truck 101, as noted above, must wash off any concrete residue from the top hopper 122, the primary chute 128, and any auxiliary chutes 130 before the concrete residue hardens. The operator usually uses an existing hose 118 on the concrete mixing truck 101 to wash off the concrete residue, but usually washes the concrete residue out into a lined container or area in the ground at a job site or delivery site 102, which poses a great deal of environmental problems for the customer or client as well as costs the client a great deal of money to later remove and to properly dispose of.

The operator may use one or more controls, including buttons or other types of control devices, located on a control system 110 on the concrete mixing truck 101. The control system 110 may be located in the cab 104 as well as attached to a structure on the frame assembly 106. The controls of the control system 110 allow the operator to control the various functions and performance of the hydraulic system 108, water supply system 114, mixing drum 112, and feeding and discharge system 120 of the concrete mixing truck 101.

The concrete mixing truck 101, as noted above, includes one or more pouring chutes that may be part of the feeding and discharge system 120 of the concrete mixing truck 101. The feeding and discharge system 120 of the concrete mixing truck 101 includes the top hopper 122 as well as the pouring chutes, which may include a primary chute 128 and any additional or auxiliary chutes 130. The top hopper 122 is located above the primary chute 128 and includes a top hopper inlet 124 and a top hopper outlet 126. A "hopper" as used herein may refer to a funnel-shaped device used to move material from one receptacle to another. Hoppers, including top hopper 122 and collection hopper 142 as shown in FIG. 1, come in a variety of shapes and sizes and may include an empty interior cavity that is usually funnel-shaped in order to contain material within the hopper.

The inlet 124 of the top hopper 122 usually leads to the opening or inlet of the mixing drum 112. The outlet 126 of the top hopper can be used to direct material from the mixing drum 112 onto the pouring chutes, including the primary chute 128 and the auxiliary chutes 130, by passing the material or contents of the mixing drum 112 through the outlet 126 of the top hopper 122 and onto the pouring chutes 128 and 130 of the concrete mixing truck 101.

Figure 4:
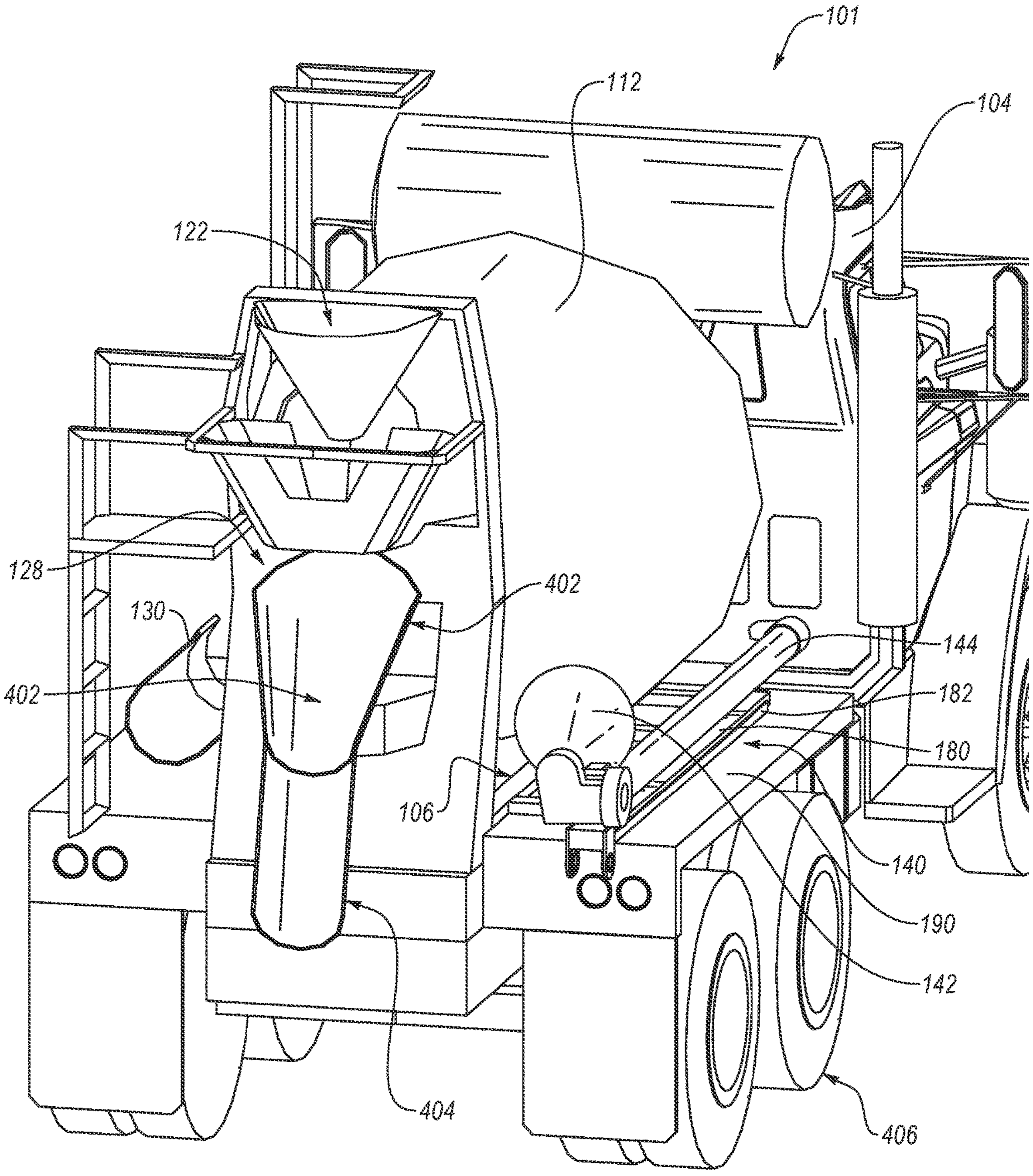
FIG. 4 is a pictorial illustration of a rear discharge concrete mixing truck with an example concrete residue collection system in a stored, retracted position.
Figure 5:
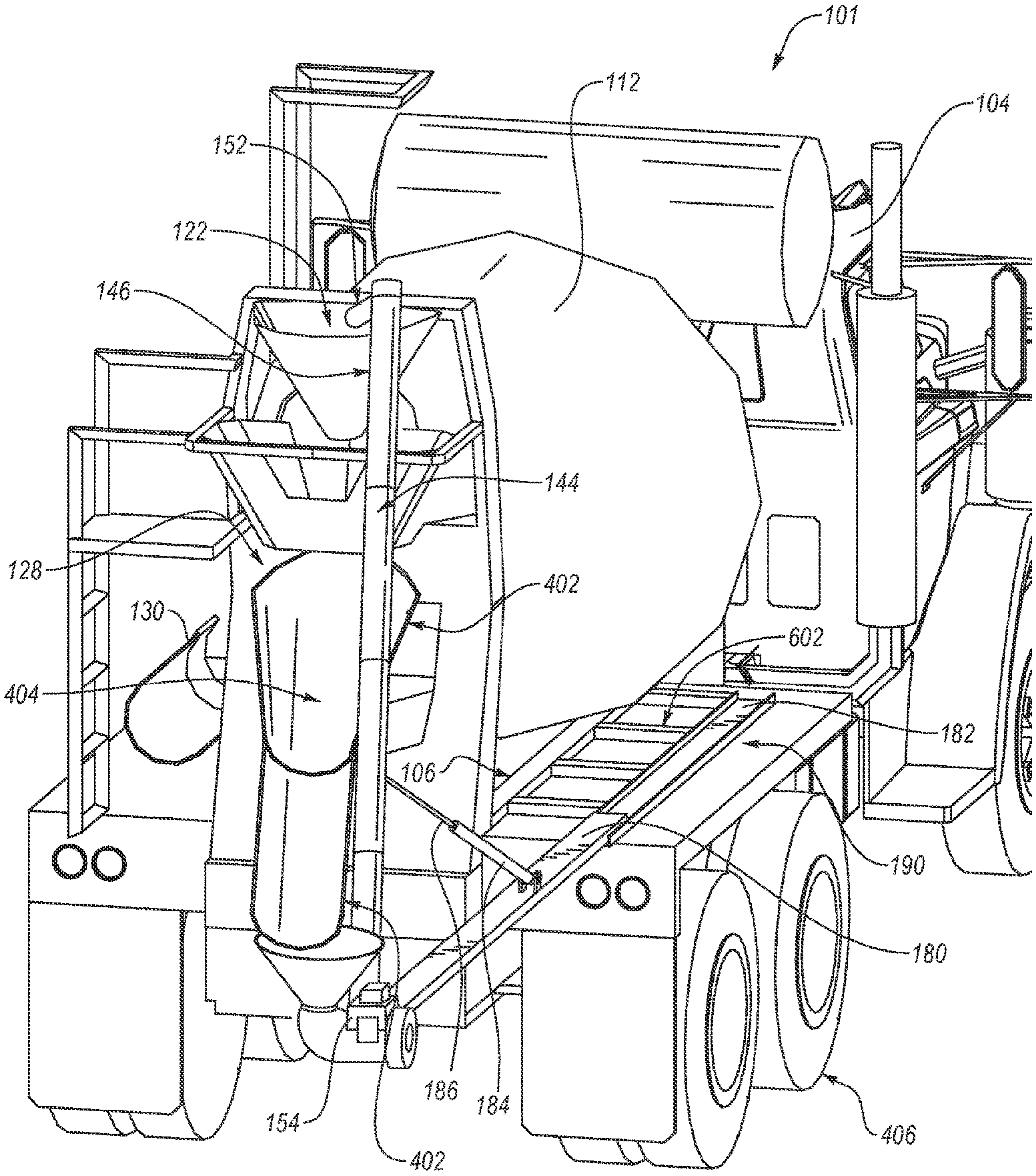
FIG. 5 is a pictorial illustration of a rear perspective view of a rear discharge concrete mixing truck with the concrete residue collection system shown in an extended, operative position.
Figure 6:
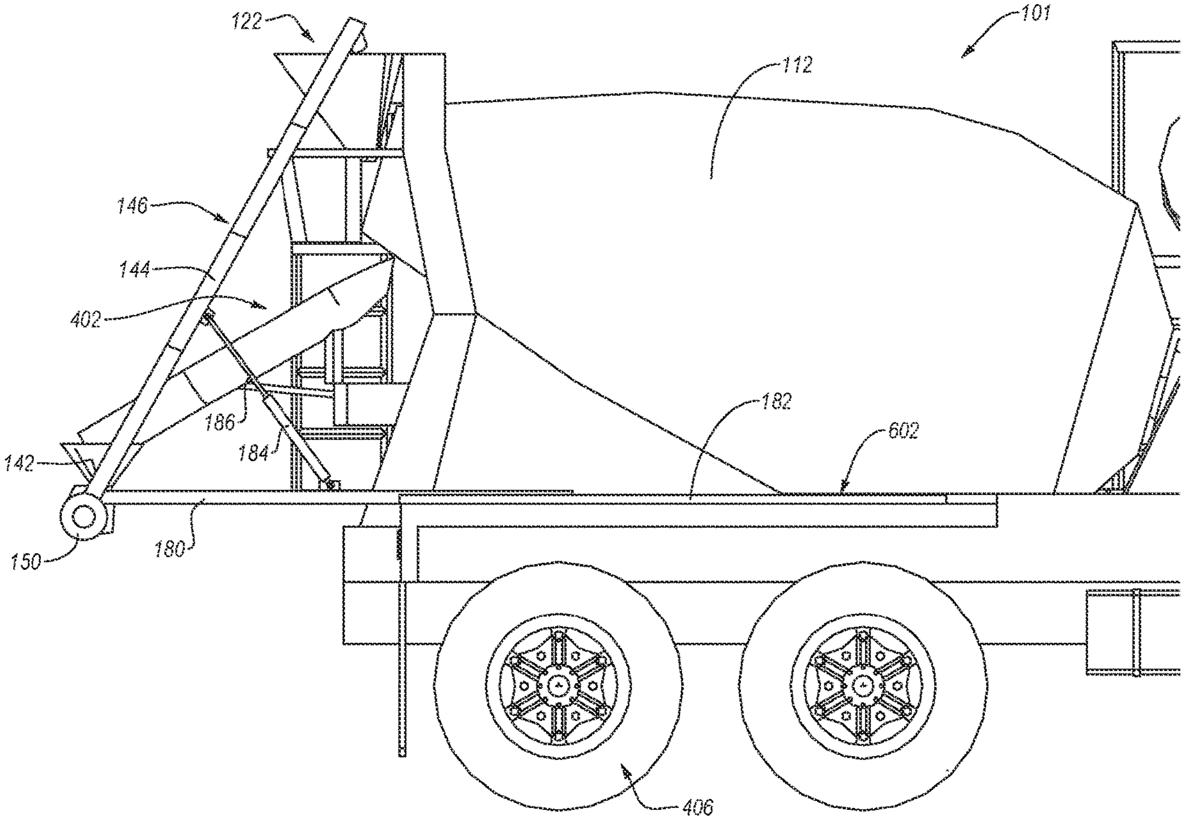
FIG. 6 is a pictorial illustration of a side view of a rear discharge concrete mixing truck with the concrete residue collection system shown in an extended, operative position.

The primary chute 128 of the concrete mixing truck 101 may include a top portion and a lower portion that can extend out or fold up when not in use, such as top portion 402 and lower portion 404 shown in FIGS. 4-6 in an example. The primary chute 128 may also be known in the art as a fold over chute because of the lower portion 404 which can be folded over the top portion 402 of the primary chute 128 when in transport mode. The lower portion 404 can be extended so as to be angled outwardly and form a continuous pouring chute with the top portion 402 when in use and in operation mode such that any concrete 162 or slurry aggregate 170 can flow down the top surface of the primary chute 128. The primary chute 128 on a concrete mixing truck 101 is typically fixedly attached to the concrete mixing truck 101 and cannot be easily removed.

In addition to including the primary chute 128, concrete mixing trucks 101 usually include auxiliary chutes 130, which are additional, separate chutes that can be individually attached to the end of the primary chute 128 in order to add more length of chute to deliver the concrete 162 at a particular delivery site 102. It is common for there to be anywhere from one to three auxiliary chutes 130 stored on any given concrete mixing truck 101 and these auxiliary chutes 130 are typically stored on the side of the concrete mixing truck 101 in case they are needed. The auxiliary chutes 130 attach via a bracket or a fitting formed on each end of the auxiliary chutes 130 and enable the auxiliary chutes 130 to be attached to the dispensing end of the primary chute 128 and to other auxiliary chutes 130.

As noted above, the mixing drum 162 includes various elements, such as cement, sand, and other aggregates that can be mixed together to form concrete 162. The concrete mixing truck 101 is designed to be driven by a driver or operator to a delivery site 102 who unloads the correct amount of concrete 162 from the mixing drum 112, through the outlet 126 of the top hopper 122 and onto the primary chute 128 and any attached auxiliary chutes 130. The concrete 162 is loaded into appropriate containers at the delivery site 102.

The concrete residue that is left behind in the top hopper 122, primary chute 128, and auxiliary chutes 130 may be referred to as slurry aggregate 170. The slurry aggregate 170 is a mixture of liquid effluent as well as the solid particles that are included in concrete 162. Accordingly, the slurry aggregate 170 refers to all of the finer and bigger particles of concrete residue or waste that remain in the top hopper 122, the primary chute 128, and auxiliary chutes 130.

Advantageously, the concrete residue collection system 140 shown in FIG. 1 is configured to collect any slurry aggregate 170 that remains in the top hopper 122 or that remains located on the primary chute 128 or any attached auxiliary chutes 130 after the initial load of concrete 162 has been delivered to a delivery site 102 by the concrete mixing truck 101. In one or more non-limiting embodiments, the concrete residue collection system 140 may include a collection hopper 142, an augur conveyor 144, a motor 154, a control system 156, and an extension platform 160.

The collection hopper 142 may be a type of hopper or container having a funnel shaped basin or interior cavity. The collection hopper 142 of the concrete residue collection system 140 may be intended to collect the slurry aggregate 170 that will be directed from the top hopper 122, primary chute 128, and auxiliary chutes 130 into the collection hopper 142. The description of FIGS. 5-6 provided below includes further details how the slurry aggregate 170 from the top hopper 122, primary chute 128, and auxiliary chutes 130 may be directed into the collection hopper 142. Collection hopper 142 may be of varying sizes and dimensions to suit the concrete residue collection system 140 and to attach to the augur conveyor 144.

Figure 2:
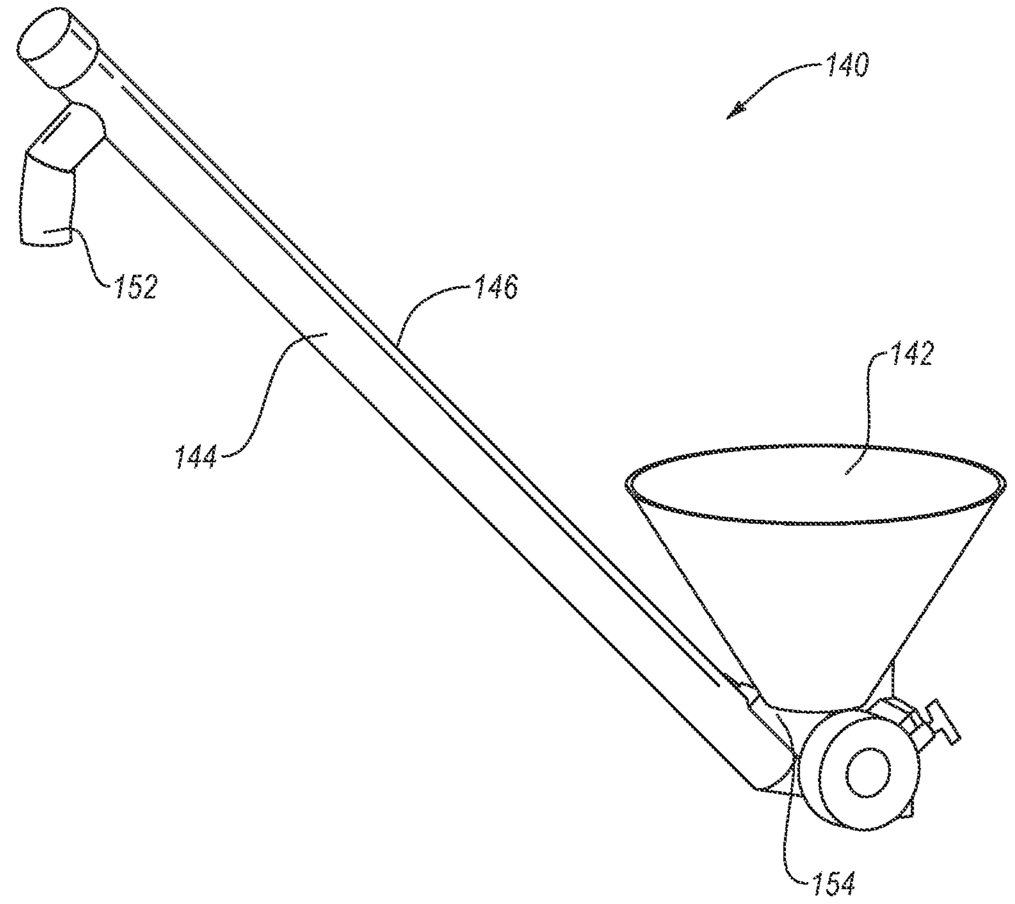
FIG. 2 is a pictorial illustration of a concrete residue collection system.
Figure 3:
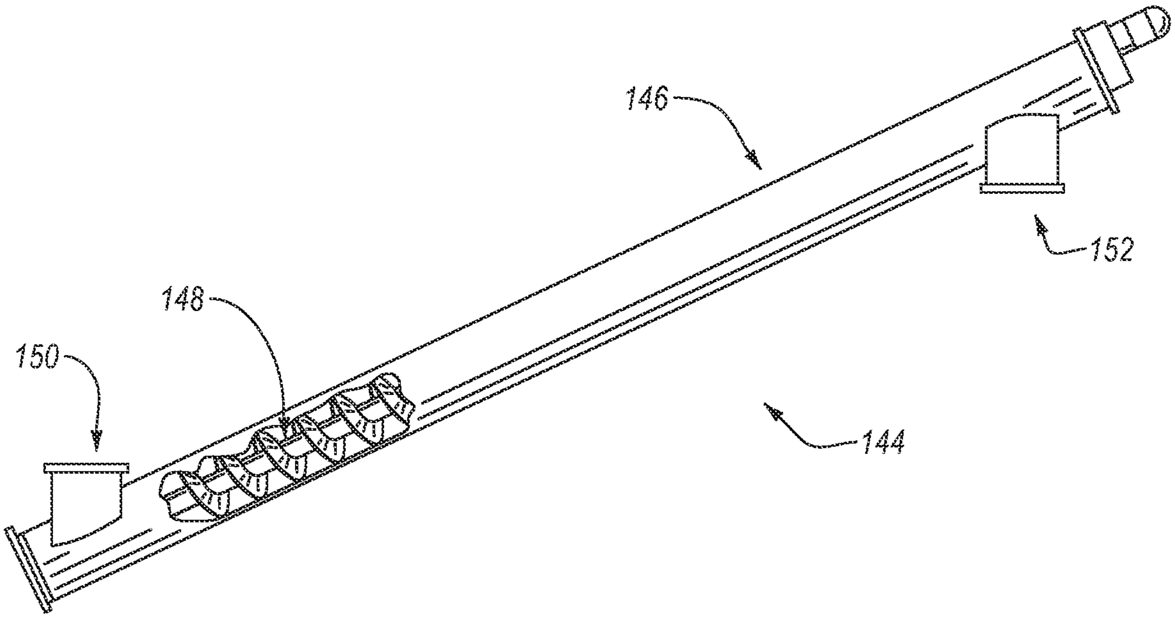
FIG. 3 is a pictorial illustration of an augur conveyor that is part of the concrete residue collection system.

The augur conveyor 144 is a type of augur conveyor as known in the art that conveys material from one end to the other of the augur conveyor 144. FIGS. 2-3 show example components of the augur conveyor 144 that may be used to convey the slurry aggregate 170 from the collection hopper 142 back into the mixing drum 112 of the concrete mixing truck 101 via a specific series of steps as further explained below.

FIG. 2 and FIG. 3 show examples of augur conveyor 144, collection hopper 142, and motor 154. The augur conveyor 144 includes a casing tube 146 which encloses a rotating helical screw 148 (e.g., as shown in the partial view in FIG. 3). The rotating helical screw 148 has fins that extend around the outer surface of the rotating, helical screw 148 that are configured to move material, such as slurry aggregate 170, from the augur conveyor inlet 150 to the augur conveyor outlet 152.

The motor 154 of the concrete residue collection system 140 is the mechanical actuator or device used to power and to operate the electromechanical components of the augur conveyor 144, including the rotating helical screw 148. In one or more non-limiting embodiments, the motor 154 may be a hydraulic motor that works in conjunction with the hydraulic system 108 of the concrete mixing truck 101 in order to convert hydraulic pressure and flow into torque and angular displacement (rotation). As shown in FIG. 2, the augur conveyor inlet 150 may be directed into the interior cavity or basin of the collection hopper 142. The casing tube 146 is angled upwards and terminates at the other end of the casing tube 146 with the augur conveyor outlet 152. The rotating helical screw 148 is contained within the interior of the casing tube 146 and transports contents from the interior of the collection hopper 142 from the augur conveyor inlet 150, into the casing tube 146, and out from the augur conveyor outlet 152.

In a non-limiting embodiment, the collection hopper 142 is firmly attached and secured to the inlet 150 of the augur conveyor 144 as if the collection hopper 142 and the augur conveyor 144 are a single unit.

The concrete residue collection system 140 may further include an extension platform 160. The extension platform 160 may be the system and the components included that operate to either extend the collection hopper 142, the augur conveyor 144, and the motor 154 so as to be positioned underneath an extended primary chute 128 of a concrete mixing truck 101 when in operation mode. The extension platform 160 further includes components that allow the collection hopper 142, the augur conveyor 144, and the motor 154 to be retracted in stored mode suitable for transporting these elements on a side of a concrete mixing truck 101. The extension platform 160 is configured to extend to a fully extended position when the concrete residue collection system 140 is in use in order to collect the slurry aggregate 170 from the concrete mixing truck 101 and redirecting the slurry aggregate 170 back into the rotating mixing drum 112 of the concrete mixing truck 101. The extension platform 160 is also configured to retract to a stored position that takes a smaller amount of space and allows the concrete residue collection system 140 to be stored on one side of the frame assembly 106 of the concrete mixing truck 101.

Figure 7:
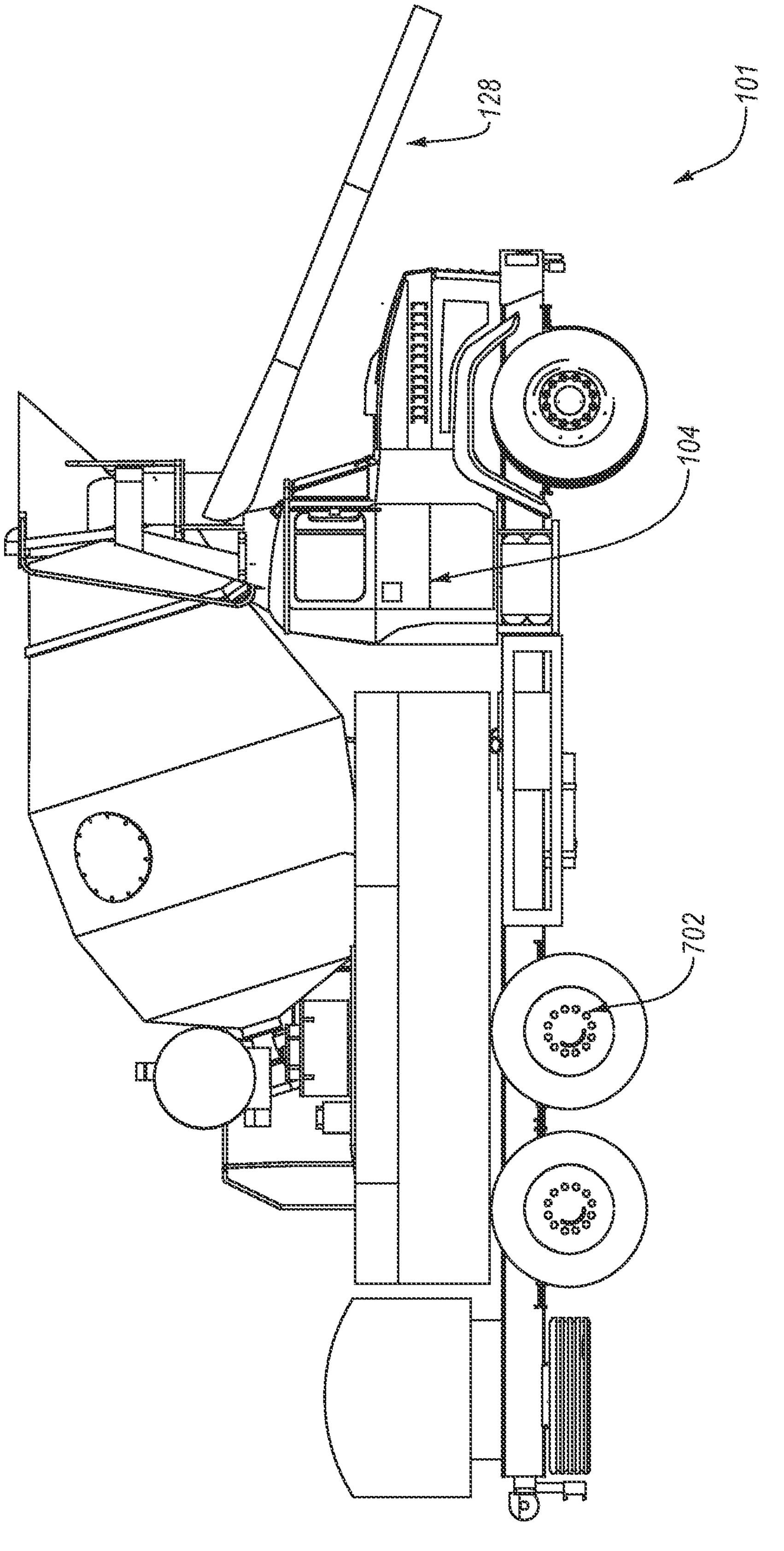
FIG. 7 is a pictorial illustration of a forward discharge concrete mixing truck.

In one embodiment, the extension platform 160 may be stored to one side of the rotating mixing drum 112 on a back side of the frame assembly 106 of the concrete mixing truck 101 as shown, for example, in FIG. 4. In particular, the extension platform 160 can be positioned on and over the rear fender 190 of the frame assembly 106 of a rear discharge concrete mixing truck 101, such as the rear discharge concrete mixing truck 101 shown in FIG. 4. A rear discharge concrete mixing truck is a concrete mixing truck that discharges the concrete 162 from pouring chutes, such as primary chute 128 and auxiliary chutes 130, that are positioned on the rear of the concrete mixing truck 101. Conversely, FIG. 7 shows an example of a forward discharge concrete mixing truck 101 which discharges concrete 162 from pouring chutes 128 and 130 that are positioned at the front of the concrete mixing truck 101 and over the cab 104 of the concrete mixing truck 101. In such an embodiment, the concrete residue collection system 140 including the extension platform 160 may be stored on the front area of the forward discharge concrete mixing truck 101 and may be attached to the front fender or other portion of a front area of the frame assembly 106 of the concrete mixing truck 101.

In one embodiment, the extension platform 160 may include one or more channel pieces that act to support, store, extend, and retract the collection hopper 142 that is attached to the augur conveyor 144. In a non-limiting embodiment, there may be a smaller C-Channel piece 180, as shown in FIG. 1, that fits over and within a larger C-Channel piece 182. The term "C-Channel" as used herein refers to a support beam having an open channel and two ends whereby each end is shaped in the form of a "C." In a preferred embodiment, the larger C-Channel piece 182 and smaller C-Channel piece 180 support beams may be made of a sturdy metal, such as steel.

In a non-limiting embodiment, the larger C-shaped channel 182 may be firmly attached to the frame assembly 106 of the concrete mixing truck 101. Specifically, there may be a specially designed bracket, such as bracket 602 shown in FIG. 5 and FIG. 6, that firmly attaches the larger C-Channel to the truck chassis frame and frame assembly 106. The term “chassis” as used herein may mean the base frame of the concrete mixing truck 101. The chassis of the concrete mixing truck 101 is known for being very solid and secure and all of the systems and components of the concrete mixing truck 101, including the mixing drum 101 and the other components, are secured to and built onto the chassis. As described above, the bracket 106 may be bolted or otherwise firmly attached to the truck chassis and frame assembly 106 towards the rear of the concrete mixing truck 101 on a rear discharge concrete mixing truck 106. The larger C-channel 182 may be suspended over the rear fender 190 such that there is a gap between the bottom surface of the larger C-Channel 182 and the top of the rear fender 190, as shown in FIG. 5. It is noted that the rear fender 190 is not capable of supporting a great deal of weight, which is why it may be preferable for the larger C-Channel 182 to be suspended over the rear fender 190 as opposed to directly contacting the top surface of the rear fender 190 of the concrete mixing truck 101. The frame assembly 106 of the concrete mixing truck 101 is very solid and sturdy and can support the weight of the attached concrete residue system 140, including the components of the extension platform 160.

Additional components that may be part of the extension platform 160 include a hydraulic lift 184 and a lifting cylinder 186. The hydraulic lift 184 or hydraulic ram may be operable in conjunction with the hydraulic system 108 of the concrete mixing truck 101 and may be energized to cause the smaller C-channel beam 180 to slide in and out of the stationary, larger C-Channel beam 182. Accordingly, the smaller C-Channel beam 180 can telescopically extend and retract within the interior of the larger C-Channel beam 182 because the hydraulic lift 184 may push out the smaller C-channel beam 180. The lifting cylinder 186 may be attached or otherwise connected to the augur conveyor 144 and may cause the augur conveyor 144 from being folded flat onto the smaller C-Channel beam 180, as shown in an example in FIG. 4, to being fully extended and lifted, as shown in an example in FIGS. 5-6.

Accordingly, in a stored, retracted position, the augur conveyor 144 may be retracted and not fully extended or lifted either behind or in front of the concrete mixing truck 101 depending on if the concrete mixing truck 101 is either a rear discharging or forward discharging concrete mixing truck 101. The collection hopper 142 may be attached to the augur conveyor 144 when in the stored, flattened, retracted position as stored within the smaller C-Channel beam 180 and stored against one side of the frame assembly 106 of the concrete mixing truck 101. Conversely, the extension platform 160 is configured to cause smaller C-Channel beam 180 to fully extend either behind or in front of the concrete mixing truck 101 as long as the collection hopper 142 is positioned beneath the extended primary chute 128 and the augur conveyor 144 is raised and lifted to its full height such that the augur conveyor outlet 152 is hovering over the inlet 124 of the top hopper 122, as further shown and explained with respect to FIG. 6.

Advantageously, the concrete mixing trucks 101 can be retrofitted to include the concrete residue collection system 101 without too much difficulty. As noted above, the extension platform 160 can extend and retract from the frame assembly 106 of the concrete mixing truck 101 and will have a small footprint when stored on the concrete mixing truck 101. Further, the concrete residue collection system 140 may use many of the existing systems of the concrete mixing truck 101, such as the hydraulic system 108 and/or water supply system 114 and may be simpler and efficient to use because the concrete residue collection system 101 uses the same hydraulic power used by the concrete mixing truck 101 conventionally. In addition to retrofitting or installing the concrete residue collection system 140 on existing concrete mixing trucks 101, the concrete residue collection system 140 as shown in FIG. 1, may also be installed on new concrete mixing trucks 101 and offer the client or customer the added benefit of not having to worry about taking care of disposing any slurry aggregate 170 disposed of in a concrete washout area on a client’s property or the delivery site 102.

The concrete residue collection system 140 may have its own control system 156 as shown in FIG. 1. The control system 156 may include a number of controls to operate and engage with the various components of the concrete residue collection system 140. As further discussed below, in one non-limiting embodiment, the control system 156 may further include one or more safety switches 158 for safely operating the augur conveyor 144, collection hopper 142, and extension platform 160.

Turning to FIG. 4, FIG. 4 shows an example of a rear discharge concrete mixing truck 101 with a concrete residue collection system 140 in a stored, retracted position against the side of the concrete mixing truck 101. Various components of a rear discharge concrete mixing truck 101 are visible in FIG. 4 including the mixing drum 112, top hopper 122, primary pouring chute 128, and an example of auxiliary chute 130. The primary pouring chute 128, as shown in FIG. 4 in a non-limiting embodiment, may include a fixed top piece 402 of the pouring chute 128, as shown in FIG. 4, that may angle downwardly away from the outlet 126 of the top hopper 122 and does not fold. The second, lower part of the primary pouring chute 128 may be the folding bottom portion 404 as also shown in FIG. 4. The bottom portion 404 can extend outward to extend the length of the primary chute 128 and can be folded upwards when not in use and may also include a removable cover.

Typically, the rear area or rear fender 190 of the frame assembly 106 on a rear discharge concrete mixing truck 101 or the area above the back wheels 406 of the mixing truck 101 typically is empty and does not include anything on that surface area. It is intended that in one non-limiting embodiment, the components of the concrete residue collection system 101 may be positioned on an extension platform 160 on this rear area of the rear discharge concrete mixing truck 101.

FIG. 4 illustrates an example of the concrete residue collection system 140 in a stored and retracted position. As noted above, in a retracted position, the concrete residue collection system 140 including the collection hopper 142, augur conveyor 144, and motor 154 may be stored within a smaller C-Channel beam 180 (e.g., as shown in FIG. 5) that can telescopically slide in and out of the larger C-Channel beam 182. The larger C-Channel beam 182 is firmly fastened or otherwise attached to the frame assembly 106 of the concrete mixing truck 101. In its stored, retracted position, as shown in FIG. 4, the augur conveyor 144 is lowered to its lowest position and is basically horizontal and level with the side of the frame assembly 106 of the concrete mixing truck 101 within the smaller C-Channel support beam 180. The smaller C-Channel beam 180 and the larger C-Channel beam 182 may be suspended over the rear fender 190 and may extend also along the length of the side of the truck frame assembly 106 towards the cab 104 of the concrete mixing truck 101.

Turning to FIG. 5 and FIG. 6, FIGS. 5 and 6 shows an example of the concrete residue collection system 140 in an extended, operational mode. In the operational mode, several steps may have occurred. First, the driver or operator of the concrete mixing truck 101 has the primary chute 128 fully extended such that the lower portion 404 of the primary chute 128 is straightened and angled outwards and connected to the top portion 402, and the lower portion 404 is not folded over as it would be in transport mode. Further, the driver or operator of the concrete mixing truck 101 has activated the controls of the control system 156 for the concrete residue collection system 140 such that the extension platform 160 is fully extended so as to position the collection hopper 142 beneath the outlet of the primary chute 128 so as to receive any slurry aggregate 170 washed off from the primary chute 128, top hopper 122, and any attached auxiliary chutes 130. Further, the augur conveyor 144 is extended to its full upright position as shown in FIGS. 5-6. At one end of the augur conveyor 144 is the augur conveyor inlet 150. The augur conveyor inlet 150 is oriented towards and connected to the interior cavity of the collection hopper 142. At the other end of the augur conveyor 144, the augur conveyor outlet 152 is directed towards the inlet 124 of the top hopper 122. The augur conveyor outlet 152 essentially hovers over and is positioned over the inlet 124 of the top hopper 122 of the concrete mixing truck 101 when ready for operation. The augur conveyor 144 includes the encased rotating helical screw 148, which is not shown in FIGS. 5-6, but is shown in an example in FIG. 3.

In its extended position, the smaller C-channel support beam 180 may be fully extended away from the larger C-Channel support beam 182. For a rear discharge concrete mixing truck 101, the smaller C-Channel support beam 180 may extend anywhere from 8 to 10 feet or more as needed behind the concrete mixing truck 101 in order to be positioned properly such that the collection hopper 142 of the concrete residue collection system 140 can be directly beneath the extended out primary chute 128 and ready to receive any washed off slurry aggregate 170 and for the augur conveyor 144 to be fully lifted and raised towards the top hopper 122 in order to redirect the slurry aggregate 170 back into the mixing drum 112 through the top hopper 122. Similarly, if the concrete residue collection system 140 is attached to a forward discharge concrete mixing truck 101 the smaller C-Channel support beam 180 may extend anywhere from 8 to 10 feet or more as needed in front of the concrete mixing truck 101 in order for the system 140 to be positioned beneath the fully extended primary chute 128 of the forward discharge concrete mixing truck 101.

The concrete residue collection system 140 can be activated to extend to its full position, for example as shown in FIGS. 5-6, after a concrete mixing truck 101 has arrived at a delivery site 102 and unloaded its load of concrete 162. The operator may operate one or more controls from the control system 156 and/or control system 110 for the concrete residue collection system 101 to extend the collection hopper 142 as connected to the augur conveyor 144 on the extension platform 160. As noted above, the collection hopper 142 and augur conveyor 144 may be stored on the retracted extension platform 160 on a rear of the frame assembly 106 of the concrete mixing truck 101 if it is a rear discharge concrete mixing truck 101 or some other location on the concrete mixing truck 101.

In order to begin the process of collecting and reclaiming the slurry aggregate 170 back into the mixing drum 112 of the concrete mixing truck 101 after unloading the initial load of concrete 162 at a delivery site 102, the operator or driver of the concrete mixing truck 101 may use a hose, such as hose 118 that is connected to the water supply system 114 to wash off the concrete residue (i.e., slurry aggregate 170) that remains on the top hopper 122 and primary chute 128 and any attachable auxiliary chutes 130. The operator or driver has to wash off the slurry aggregate 170 after delivering a load of concrete 162 to a delivery site 102 (as shown in FIG. 1).

The invention as shown in FIGS. 1-6 allows the driver of the concrete mixing truck 101 to wash the slurry aggregate 170 into the collection hopper 142 instead of into another concrete washout area, such as the concrete washout areas located at a delivery site 102 that a customer or client typically must take care of hauling elsewhere when a job or project is completed.

Accordingly, the driver can aim the hose 118 of the concrete mixing truck 101 at the fully extended and operational top hopper 122, the primary chute 128, and any auxiliary chutes 130 and the slurry aggregate 170 will flow into the interior cavity or basin of the collection hopper 142 which is positioned underneath the extended primary chute 128. Accordingly, any concrete residue in the form of slurry aggregate 170 flowing from the top hopper 122 onto the pouring chutes 128 and 130 can be washed into the collection hopper 142.

In a non-limiting embodiment, it is intended the driver or operator can attach each auxiliary chute 130 that is used during the delivery of the concrete 162 to the primary chute 128 and wash off any slurry aggregate 170 from each auxiliary chute 130. There may be specially designed brackets that allow the driver or operator to attach each auxiliary chute 130 used (if any are needed) to extend the length of the primary chute 128 and to deliver the concrete 162 to an appropriate location at the delivery site 102. Once the auxiliary chute 130 is attached to the primary chute 130 via brackets, fasteners, or some other way to temporarily suspend the auxiliary chute 130 over the primary pouring chute 130, the driver or another individual associated with the concrete mixing truck 101 may use the hose 118 to wash off the front and back sides of each auxiliary chute 130. Any slurry aggregate 170 remaining on the auxiliary chute 130 may be washed downwards and onto the slanted downwardly oriented top surface of the primary pouring chute 128 and into the interior basin of the collection hopper 142 of the concrete residue collection system 140. The slurry aggregate 170 will then be redirected through the inlet 150 of the augur conveyor 144, up through the internally rotating helical screw 148, and out of the augur conveyor outlet 152 and into to the inlet 124 of the top hopper 122 where it can be redirected to flow into the mixing drum 112. The driver or another individual may perform the attaching, washing, and then removing process for each auxiliary chute 130 as needed. As noted above, sometimes there are one to three or more auxiliary chutes 130 included on a concrete mixing truck 101 that are stored somewhere on the truck 101. The driver or operator may return the washed auxiliary chutes 130 to their previously stored positions once the washing and transferring of slurry aggregate 170 is complete.

As noted above, the motor operated augur conveyor 144 is configured to move the slurry aggregate 170 from the collection hopper 142 towards the inlet 124 of the top hopper 122 on the concrete mixing truck 101 and back into the rotating mixing drum 112. In order to do this, when the motor 154 of the augur conveyor 144 is activated, the augur conveyor 144 transfers or conveys any slurry aggregate 170 washed into and contained in the collection hopper 142 from the augur conveyor inlet 150, through the interior of the casing tube via the rotating helical screw 148 that is angled upward, and out of the augur conveyor outlet 152. The slurry aggregate 170 exits the augur conveyor outlet 152 and into the inlet 124 of the top hopper 122 which connects with the inlet of the mixing drum 112 on the concrete mixing truck 101 so that the slurry aggregate 170 flows back into and is reclaimed in the mixing drum 112 of the concrete mixing truck 101. Accordingly, the slurry aggregate 170 is recycled back into the mixing drum 101, which is already equipped and adapted to safely contain the components of slurry aggregate 170.

Once the cleaning and washing process has been completed and the slurry aggregate 170 transferred to the mixing drum 112 via the concrete residue collection system 140 components, the driver or operator of the concrete mixing truck 101 will operate the controls of the control system 156 to return the collection hopper 142 and augur conveyor 144 to their retracted, stored position on the concrete mixing truck 101, such as that shown in FIG. 4. The driver of the concrete mixing truck 101 can then return to the original production site 100 or an alternate unloading area where the slurry aggregate 170 from the mixing drum 112 can be removed and extracted in a safe and environmental manner and in the usual manner that production sites 100 handle any concrete or slurry aggregate 170 that they have to dispose of.

It is anticipated that the original production site 100 of the concrete 162 is able to dispose of the slurry aggregate 170 according to their customized, safe, and environmentally responsible procedures. Advantageously, the customer and client save time and money and does not have to arrange for the hauling away of slurry aggregate 170 contained in concrete washout areas at their delivery site 102 and also benefits from having a cleaner job site. It is clear that concrete mixing trucks 101 in every location can benefit from the concrete residue collection system 140 as described herein in one or more non-limiting embodiments.

In one or more non-limiting embodiments, the control system 156 may include one or more safety switches 158 to make sure that the components of the concrete residue collection system 140 are extended and retracted in a safe manner by the driver or other operator of the concrete mixing truck 101. The safety switch 158 can have parts that correspond to specific actions or outputs of the concrete residue collection system 140 in a non-limiting embodiment in order for the extension of the concrete residue collection system 142 to happen in at least three steps. For the first step, the driver or operator holds down the safety switch 158 and the extension platform 160 initially extends outward and in position underneath the primary pouring chute 128. The driver continues to hold down the safety switch 158 or shifts the safety switch 158 in another direction (e.g., if the safety switch 158 is in the form of a shiftable joystick) in order for the augur casing tube 146 to extend out to its full height until it reaches its terminal position where the augur conveyor outlet 152 is hovering or positioned above the inlet 124 of the top hopper 122. The third step may entail the driver holding down the safety switch 158 further or shifting the safety switch 158 in another direction so that the rotating helical screw 148 begins rotating in response to activating the motor 154.

After the driver engages in these series of steps via the safety switch 158 to extend the concrete residue collection system 140, in one or more non-limiting embodiment, the concrete residue collection system 140 is fully engaged and activated and ready to collect slurry aggregate 170 that is washed off of the concrete mixing truck 101 in the manner described above. This described method above is one example of a method of using the one or more safety switches 158. In other non-limiting embodiments, when the driver or operator first depresses the safety switch 158, the rotating helical screw 148 may be energized and begin rotating and then the extension of the collection hopper 142 on the extension platform 160 and extension of the augur conveyor 144 to its operative position can occur.

Similarly, upon completion of the cleaning process and returning the slurry aggregate 170 to the mixing drum 112 of the concrete mixing truck 101 via the process described above, the driver depresses or selects the safety switch 158 which may stop the rotating helical screw 148 from turning on in one non-limiting embodiment. The driver continues to depress the safety switch 158 which returns the augur conveyor 144 to its lowest position, and then the next press of the safety switch 158 by the driver may return the lowered augur conveyor 144 and the collection hopper 142 to its stored position on the concrete mixing truck 101 and return the extension platform 160 to its retracted position, such as that shown in FIG. 4.

The inclusion of one or more safety switches 158 as part of the control system 156 of the concrete residue collection system 101 forces the driver or other operator to be aware of any safety concerns in extending and retracting the concrete residue collection system 140, meaning being aware and checking if anyone is located too closely behind or in front of the concrete mixing truck 101 and not endangering anyone with the extension or retraction of the concrete residue collection system 140. Further, the one or more safety switches 158 forces the driver or other operator to be aware as to the timing of the rotation of the helical screw 148 and to be sure to turn it off before returning to its stored, transport position. The driver is forced to follow a series of steps using the safety switch 158 to safely extend and retract the concrete residue collection system 101 and in this manner, any potential accidents that may occur or mistakes in the operation of the concrete residue collection system 140 are avoided.

Turning to FIG. 7, FIG. 7 is an example of a forward discharging concrete mixing truck 101. The cab 104 of the concrete mixing truck 101 is located beneath the top hopper 122 and beneath the primary pouring chute 128 in this type of concrete mixing truck, and these components are placed ahead of the rotating mixing drum 112. The frame assembly 101 supports these and other components and systems of the concrete mixing truck 101 above the wheels 702 of the forward discharge concrete mixing truck 101. The concrete residue collection system 140 as described above in FIGS. 1-6 can be adapted to include the same components described above and function in the same manner as for a rear discharge concrete mixing truck 101, as shown in FIGS. 4-6, but may be positioned to the front of the forward discharge concrete mixing truck 101 so that the extension platform 160 extends outwardly towards the front of the forward discharge concrete mixing truck 101, such that in operation and in use, the collection hopper 142 is positioned beneath the primary pouring chute 128 in front of the concrete mixing truck 101 and in front of the cab 104. Any modifications may be made to adapt the concrete residue collection system 140 to suit a forward discharge concrete mixing truck 101.

Figure 8:
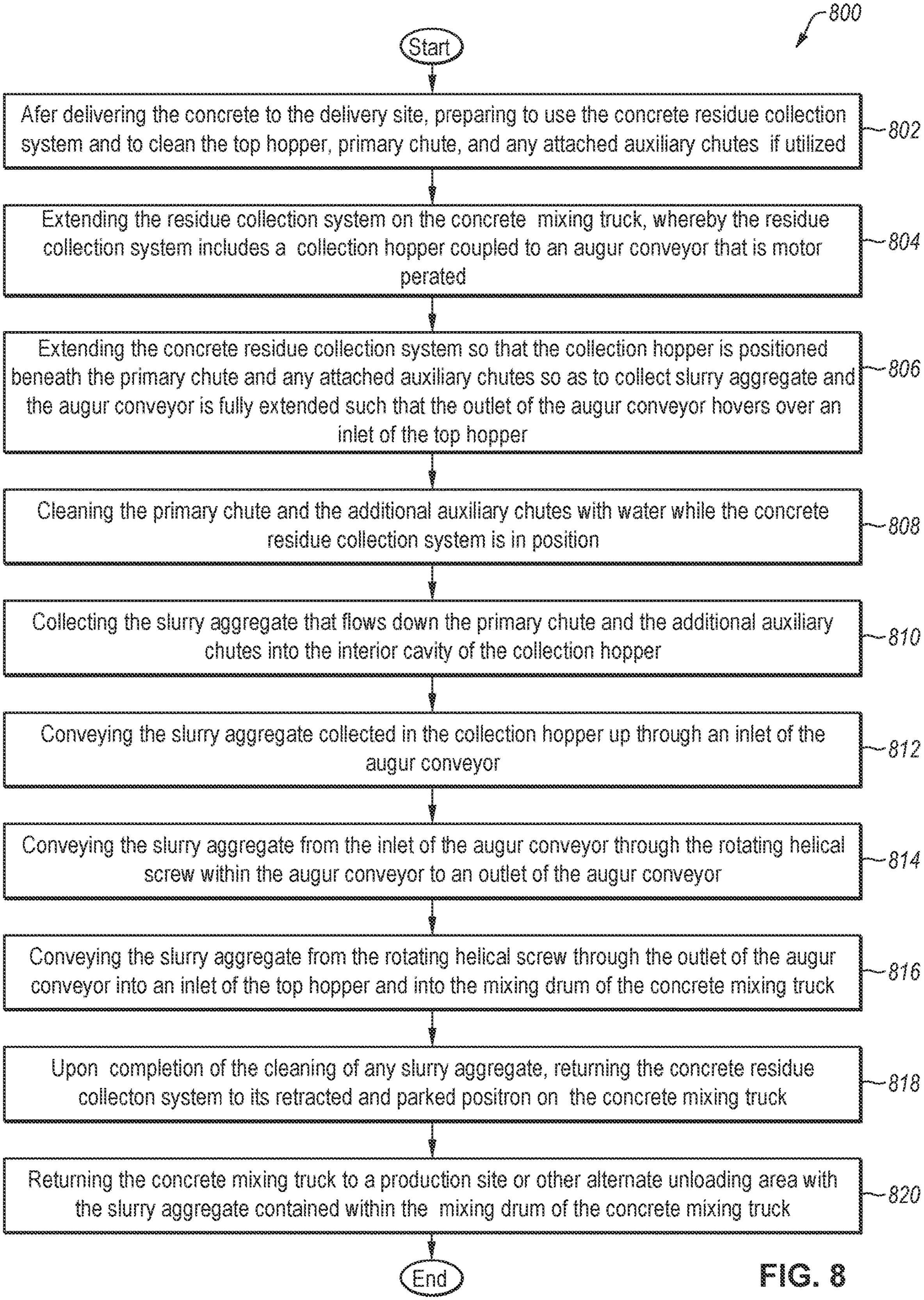
FIG. 8 is a flowchart of an exemplary method of using a concrete residue collection system on a concrete mixing truck.

FIG. 8 is a flowchart for an exemplary method of using concrete residue collection system 101 as described above in FIGS. 1-7. As shown in FIG. 8, at step 802, after delivering the concrete 162 to the delivery site 102, as shown in FIG. 1, the driver or other operator may prepare to clean the top hopper 122, primary chutes 128, and any attached auxiliary chutes 130 and to recycle the slurry aggregate 170 off of these chutes 128 and 130 (if the auxiliary chutes 130 are utilized in the unloading and delivery of the concrete 162). At step 804, the concrete residue collection system 140 may be extended in position beneath the primary chute 128 and any attached auxiliary chutes 130, whereby the concrete residue collection system 140 includes a collection hopper 142 attached to or coupled to an augur conveyor 144 that is motor operated.

At step 806, the concrete residue collection system 140 is extended such that the collection hopper 142 is positioned beneath the primary chute 128 in order to collect the slurry aggregate 170. Further, at step 806, the augur conveyor 144 is fully extended and raised to its full height such that the outlet 152 of the augur conveyor 144 hovers over an inlet 124 of the top hopper 122 of the concrete mixing truck 101.

At step 808, the process may include the driver or other operator cleaning the top hopper 122, primary chute 128, and any attached auxiliary chutes 130 with water (e.g., using the hose 118 and the water supply system 114 on the concrete mixing truck 101) while the concrete residue collection system 140 is in place and fully extended in operative mode. At step 810, as the driver or operator washes down the top hopper 122, primary chute 128, and any attached auxiliary chutes 130 with water, the slurry aggregate 170 flows down into the interior cavity of the collection hopper. At step 812, the slurry aggregate 170 is conveyed from the collection hopper 142 into an inlet 150 of the augur conveyor 144. At step 814, the slurry aggregate 170 is conveyed from the inlet 150 of the augur conveyor 144 through the rotating helical screw 148 located within the casing tube 146 of the augur conveyor 144 to an outlet 152 of the augur conveyor 144.

At step 816, the process may continue with the slurry aggregate 170 being conveyed from the rotating helical screw 148 through the outlet 152 of the augur conveyor 144 into an inlet 124 of the top hopper 122 and back into the mixing drum 112 of the concrete mixing truck 101. At step 818, upon completion of the cleaning process and returning of the slurry aggregate 170 to the mixing drum 112, the concrete residue collection system 140 is retracted and returned to its stored position on the concrete mixing truck 101. At step 820, the process may end with the driver returning the concrete mixing truck 101 to an original production site 100 or an alternate unloading area in order to dispose of the slurry aggregate 170 contained within the mixing drum 112 in a safe and environmentally responsible manner.

FIGS. 9-21 provide additional aspects of the concrete residue collection system 140 shown in FIG. 1 and discussed above with respect to FIGS. 2-8. The concrete residue collection system 900 shown in FIGS. 9-21 may include one or more elements that are the same as or similar to the elements shown in FIG. 1 and discussed above. Accordingly, the extension platform 1002 shown in FIG. 10 may be in accordance with the extension platform 160 shown in FIG. 1 in one or more non-limiting embodiments. The augur conveyor 944 in FIG. 10 may be in accordance with augur conveyor 144 shown in FIG. 1 and described above. The collection hopper 1006 shown in FIG. 10 may be in accordance with the collection hopper 142 shown in FIG. 1. The motor 154 described above and shown in FIG. 1 may be housed by the motor housing 954 shown in FIG. 10. The casing tube 946 shown in FIG. 10 may be in accordance with the casing tube 146 shown in FIG. 1 and described above. Further, the rotating helical screw shown 1402 shown in FIG. 14 may be in accordance with the rotating helical screw 148 shown in FIG. 1

Further, the concrete residue collection system 900 may be attached to a frame assembly 106 of a concrete mixing truck 101 whether the concrete mixing truck 101 is a rear discharge mixing truck 101, as shown in FIGS. 4-6 or whether the concrete mixing truck 101 is a forward discharge mixing truck 101, as shown in FIG. 7. The slurry aggregate 170 may still be collected from the top hopper 122 of any type of concrete mixing truck 101 by having water flow down the top hopper 122 and through any primary pouring chutes 128 or added auxiliary chutes 130 into a collection hopper (e.g., collection hopper 1006 shown in FIG. 10) of the concrete residue collection system 900 shown in FIGS. 9-21, and then reclaimed and stored in the mixing drum 112 of the concrete mixing truck 101.

Figure 9:
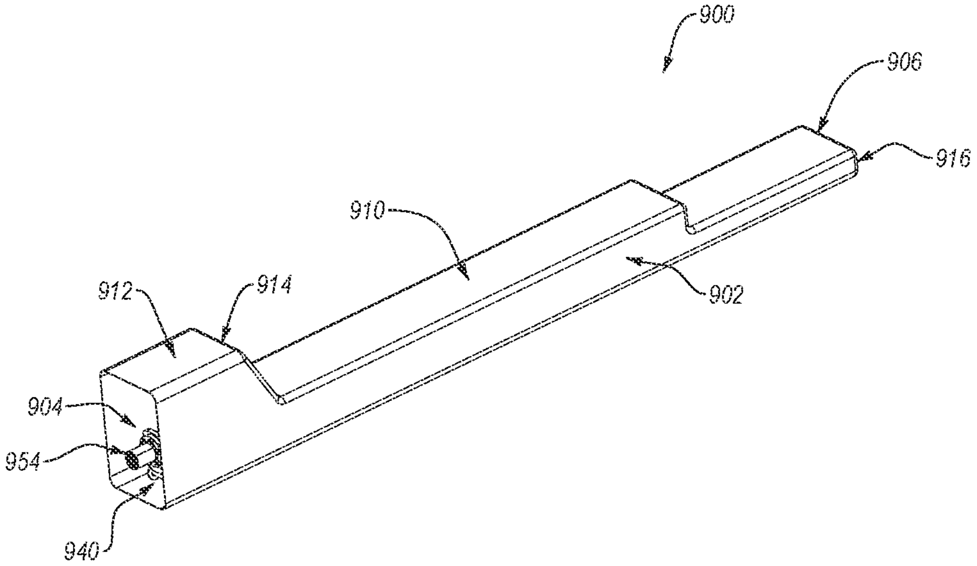
FIG. 9 is a pictorial illustration of another embodiment of the concrete residue collection system having an enclosure.

FIG. 9 shows an example of the concrete residue collection system 900 having a protective housing 902 that encloses the concrete residue collection system 900 when the concrete residue collection system 900 is in a stored position as shown in FIG. 9 and not in use to reclaim any slurry aggregate 170. The protective housing 902 shown in FIG. 9 may be designed to fit a full length and height of the concrete residue collection system 900 and protect the components of the concrete residue collection system 900 from damage.

The protective housing 902 may be attachable to a frame assembly 106 of the concrete mixing truck 101, including attachable to a rear fender 190 of the concrete mixing truck 101. The protective housing 902 may be attachable to the frame assembly 106 of the concrete mixing truck 101 using any attachment means known in the art, including, using fasteners, welding, or any other means of attachment. Further, the protective housing 902 may include one or more ports for tubes and/or wires to extend into the protective housing 902 in order to connect one or more components of the concrete residue collection system 900 with a hydraulic system 108 of the concrete mixing truck 101 and with/or a control system 110 of the concrete mixing truck 101.

The protective housing 902 may include a main entrance or opening 904 that leads into the interior cavity of the protective housing 902. Accordingly, as shown in FIG. 9, the protective housing 902 may be open at one end (e.g., at the opening 904) and closed at an opposite end 916.

The protective housing 902 may include a lower section 906 that joins with a middle section 910, and an upper section 912. The middle section 910 may be joined with the upper section 912 of the protective housing 902 by an inclined piece 914 as shown in FIG. 9.

In a non-limiting embodiment, the entire length of the concrete residue collection system 900 is configured to fit within the interior cavity of the protective housing 902, as shown in FIG. 9. FIG. 9 also shows a motor housing 954 visible at the open end of the protective housing 902.

Figure 10:
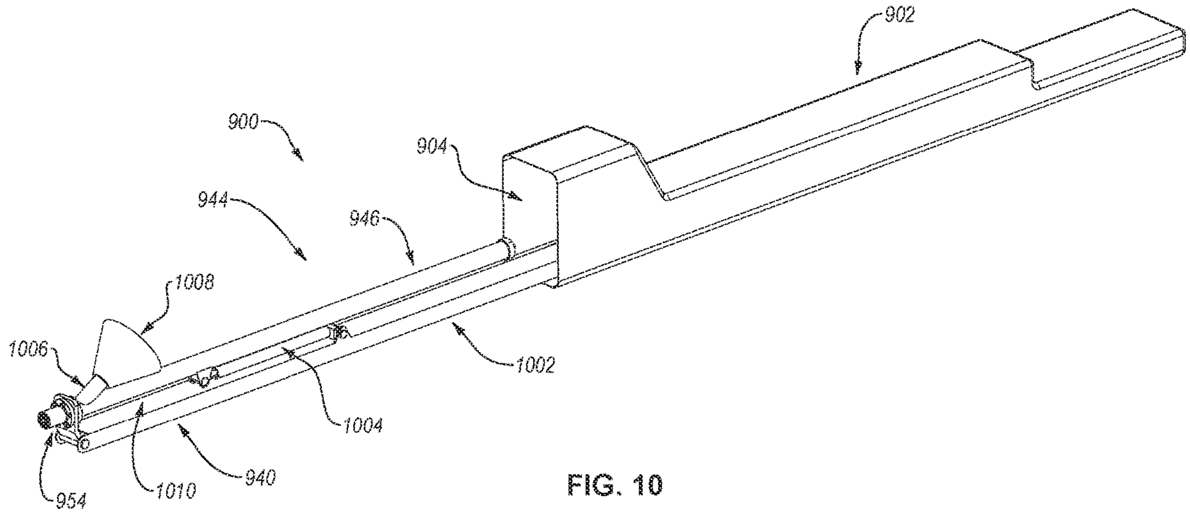
FIG. 10 is a pictorial illustration of the concrete residue collection system shown in FIG. 9 in a first extension position.

FIG. 10 shows the concrete residue collection system 900 extended in a horizontal direction away from an interior cavity of the protective housing 902 and further shows the augur conveyor 944 in a collapsed state. In one or more non-limiting embodiments, the concrete residue collection system 900 may include one or more augur conveyors 944, which may include one or more extension platforms 1002, hydraulic cylinders 1004, a collection hopper 1006, and a motor housing 954.

Figure 14:
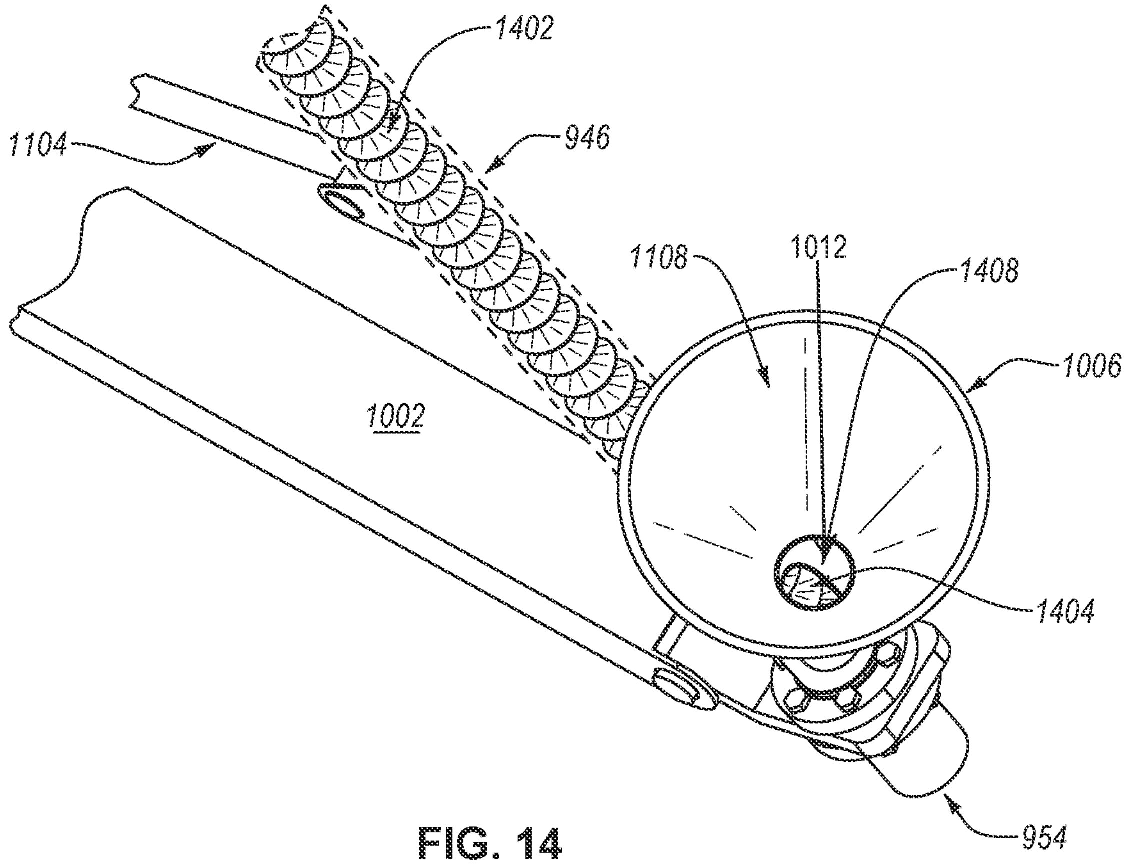
FIG. 14 is a pictorial illustration of a collection hopper and an interior view of a rotating helical screw inside a casing tube of the concrete residue collection system shown in FIG. 9.
Figure 15:
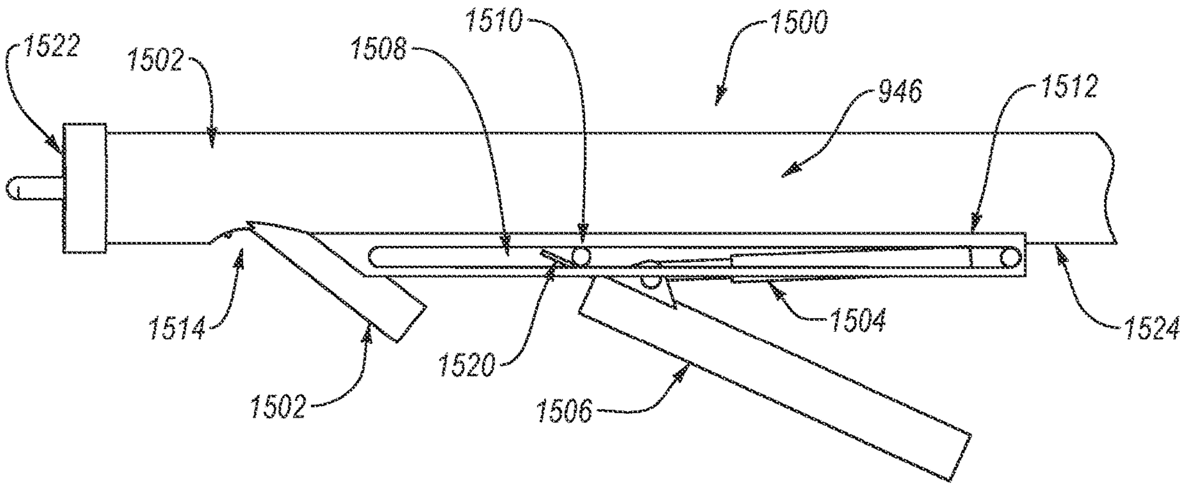
FIG. 15 is a pictorial illustration of an augur conveyor outlet at a top of the augur conveyor and concrete residue collection system shown in FIG. 9.

The one or more extension platforms 1002 may be made of one or more telescoping bars. Further, the concrete residue collection system 900 as shown in FIG. 10 may include one or more hydraulic cylinders 1004 that function to raise and lower an attached casing tube 946 that is part of the augur conveyor 944. Inside of the casing tube 946 is a rotatable helical screw 1402 as shown in FIG. 14. The augur conveyor 944 shown in FIGS. 9-21 and its components function in accordance with the description provided above for the complimentary components shown in FIG. 1. Accordingly, when powered by a motor, such as motor 154 shown in FIG. 1 and discussed above, the rotating helical screw 1402 may transport slurry aggregate 170 from an augur conveyor inlet, such as augur conveyor inlet 1404 shown in FIG. 14 in an upward direction to an augur conveyor outlet, such as augur conveyor outlet 1514 as shown in FIG. 15.

The collection hopper 1006, as shown in FIG. 10, may include a wide opening 1008 and may be funnel shaped. The funnel outlet 1012 may lead into the augur conveyor inlet 1404 as shown in also in FIG. 14.

In a non-limiting embodiment, when the extension platform 1002 is extended outwards in a horizontal direction away from an opening 904 of the protective housing 902, the extension platform 1002 and concrete residue collection system 900 are also extended in a horizontal direction away from the concrete mixing truck 101. If the concrete mixing truck 101 is a rear discharge mixing truck 101, as shown in FIGS. 4-6, then the extension platform 1002 extends to a rear of the rear discharge mixing truck 101 in operation. If the concrete mixing truck 101 is a forward discharge mixing truck 101, as shown in FIG. 7, the extension platform 1002 extends to the front of the forward discharge mixing truck 101. In either case, when fully extended, a collection hopper 1006 is positioned beneath any utilized pouring chutes, including the primary chute 128 and any attached auxiliary chutes 130 whether the concrete mixing truck 101 is a rear discharge mixing truck or a forward discharge mixing truck. Additionally, when fully extended, the casing tube 946 is extended at an angle upwardly to a full height such that the augur conveyor outlet 1514 and any connected exit tubes or pipes or discharge assembly 1500 as shown in FIGS. 15-20 are also positioned above a top hopper 122 of the concrete mixing truck 101.

In a non-limiting embodiment, there may be a gap 1010 between the top surface of the extension platform 1002 and the underside of the casing tube 946. At least one hydraulic cylinder may be positioned between the underside of the casing tube 946, as shown in FIG. 10, and the top surface of the extension platform 1002.

Figure 11:
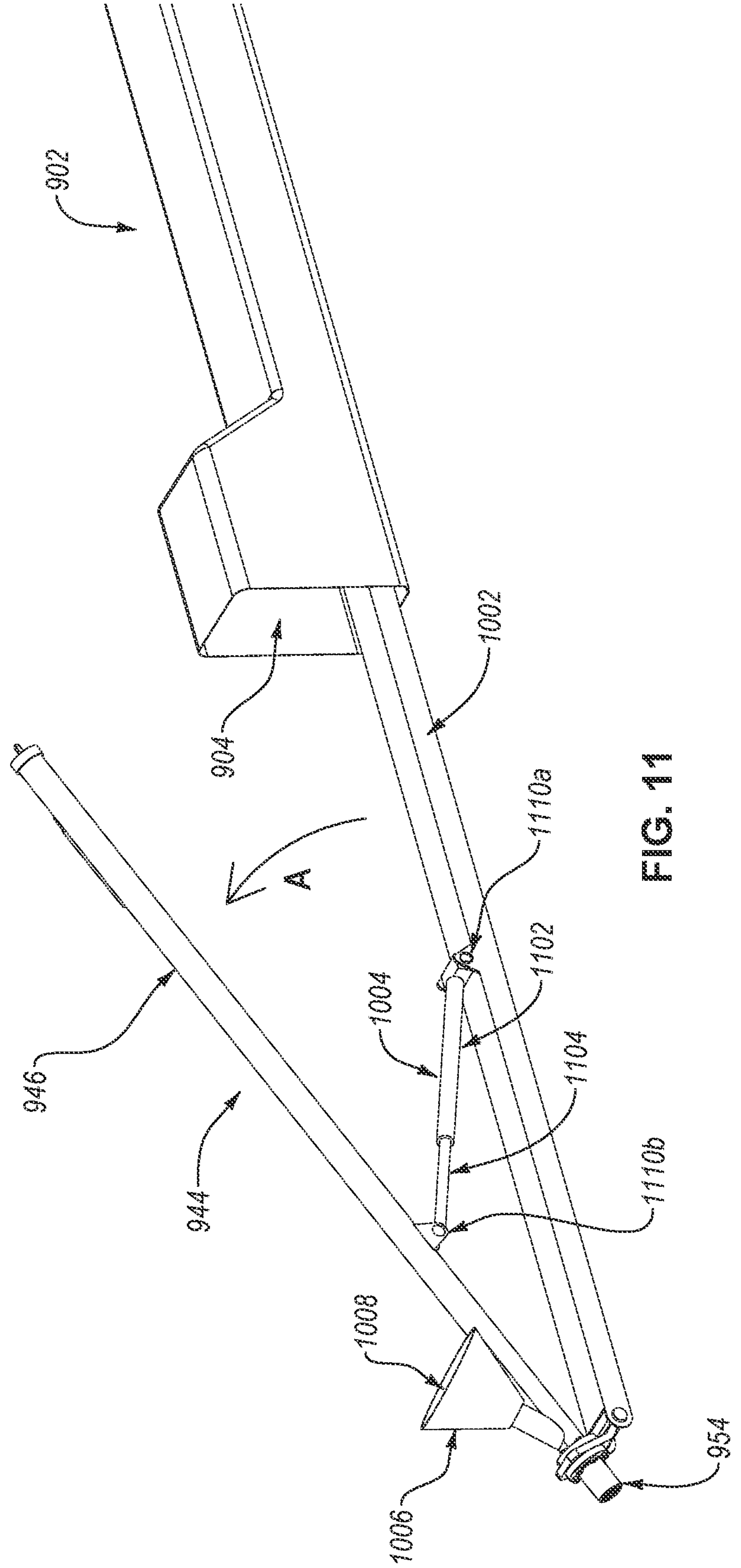
FIG. 11 is a pictorial illustration of the concrete residue collection system shown in FIG. 9 in a second extension position.

FIG. 11 shows the augur conveyor 944 in a half-erect state whereby the extension platform 1002 is extended outwardly away from the protective housing 902 opening 904 and interior cavity and in operation, would be positioned beneath a primary chute 128 and auxiliary chutes 130 of the concrete mixing truck 101. FIG. 11 shows that the casing tube 946 is adapted to be raised upwardly in a direction as shown by the arrow A in FIG. 11.

The one or more hydraulic cylinders 1004 may be adapted to raise and lower the casing tube 946 using one or more control elements of the control system 156 shown in FIG. 1 and discussed above. In a non-limiting embodiment, the hydraulic cylinder 1004 may be attached to a top surface of the extension platform 1002 by a first hinge **1110*a* and a second hinge 1110*b*. The hydraulic cylinder 1004 is oriented to attach to the top of the extension platform 1002 and raise and lower the casing tube 946 via the attached hinge 1110*b* that attaches to the underside of the casing tube 946 at one end of the hydraulic cylinder 1004. In a non-limiting embodiment, the hydraulic cylinder 1004 may include two pieces as shown in FIG. 11. The hydraulic cylinder 1004 may be made up of a first piece 1102 that houses a second piece 1104 that can telescopically extend into and out of the first piece 1102**.

Figure 12:
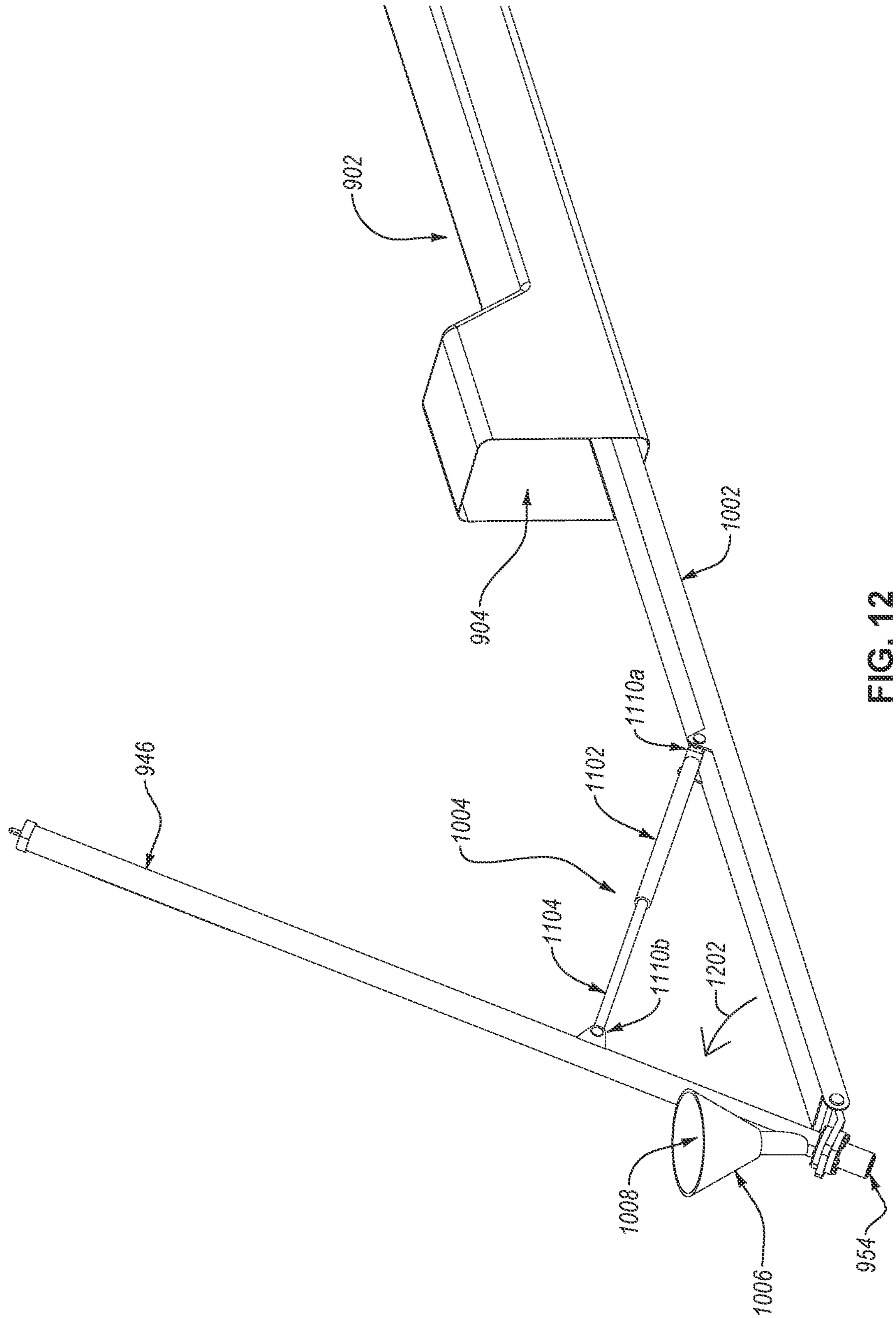
FIG. 12 is a pictorial illustration of the concrete residue collection system shown in FIG. 9 in a third extension position.

FIG. 12 shows the casing tube 946 in a fully erect state. The casing tube 946 is raised at an angle 1202 with respect to the extension platform 1002 such that the casing tube 946 is at its maximum height, as it would be when positioned so that its outlet can be positioned over a top hopper 122 of the concrete mixing truck 101 in order to discharge collected slurry aggregate 170 into the top hopper 122 and then back into the mixing drum 112 of the concrete mixing truck 101. Advantageously, the casing tube 946 can lay horizontally parallel to the extension platform when in a stored position so as not to take up too much room in transit. When in use, the casing tube 946 can rotate over a range of degrees until the maximum angle 1202 is reached and the casing tube 946 is fully erect and ready for operation.

Figure 21:
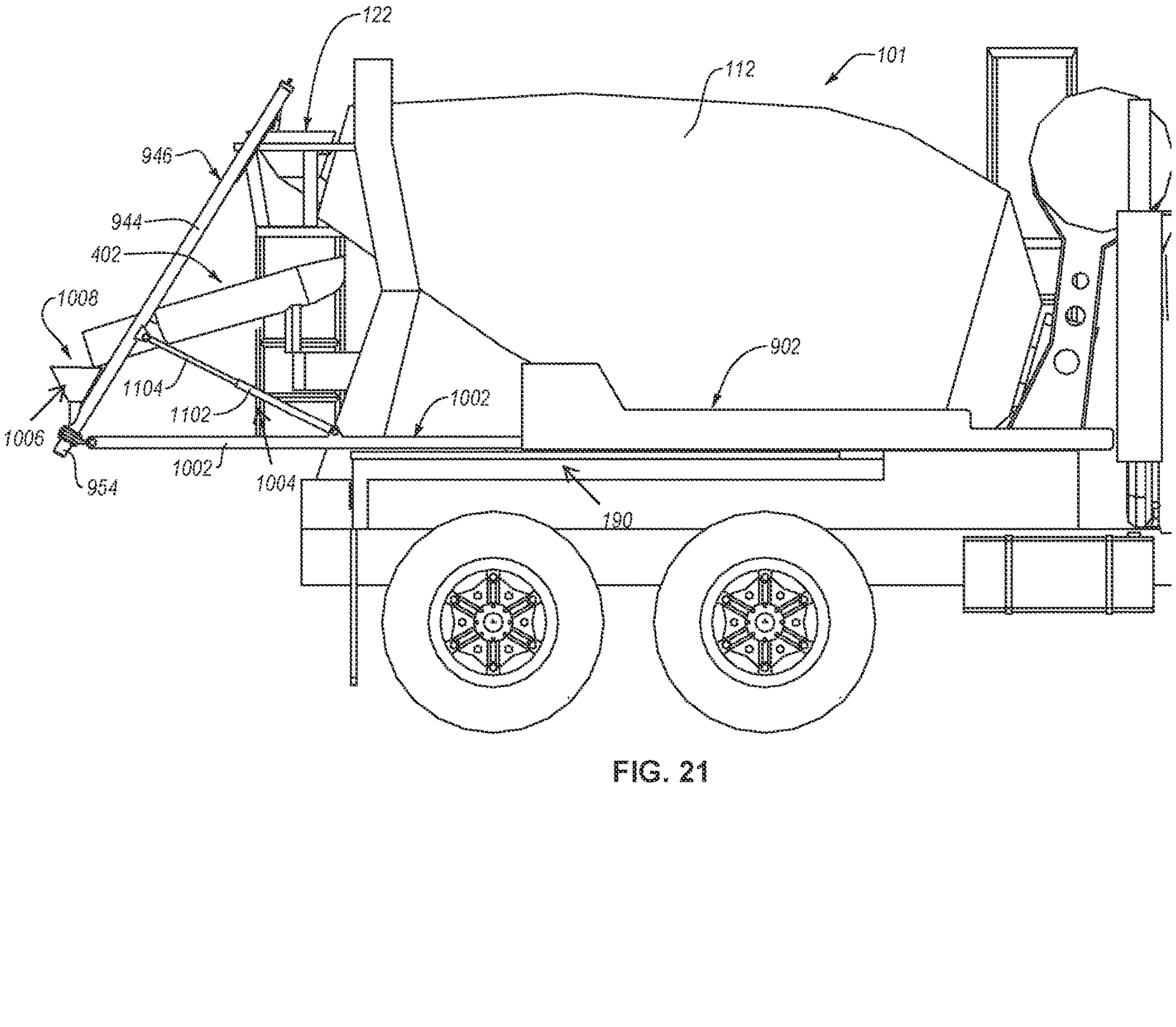
FIG. 21 is a pictorial illustration of a rear discharge concrete mixing truck with the augur conveyor shown in FIG. 9 in a fully extended position ready to discharge slurry aggregate into a top hopper of the concrete mixing truck.

Accordingly, when the casing tube 946 is raised to its maximum height as shown in FIG. 12, the hydraulic cylinder 1004 is also fully extended. The collection hopper 1006 is also no longer oriented in a horizontal direction, but is oriented in a vertical direction, and opening 1008 of the collection hopper 1006 is facing upwards. FIG. 21 shows an example of the concrete residue collection system 900 in position behind a rear frame assembly 106 of a rear discharge concrete mixing truck 101. When the extension platform 1002 is fully extended in an outward direction behind the rear discharge concrete mixing truck 101 shown in FIG. 21 and the casing tube 946 is fully raised to its maximum height, in a non-limiting embodiment, the operator of the concrete mixing truck 101 may further adjust if needed the positioning of the extension platform 1002 and the casing tube 946, but ultimately, the collection hopper 1006 of the concrete residue collection system 900 is positioned beneath any pouring chutes of the concrete mixing truck 101, including any primary chutes 128 and any attached auxiliary chutes 130. Further, the outlet of the casing tube 946 and/or the discharge assembly 1500 is fully assembled and positioned over an inlet 124 of the top hopper 122.

Figure 13:
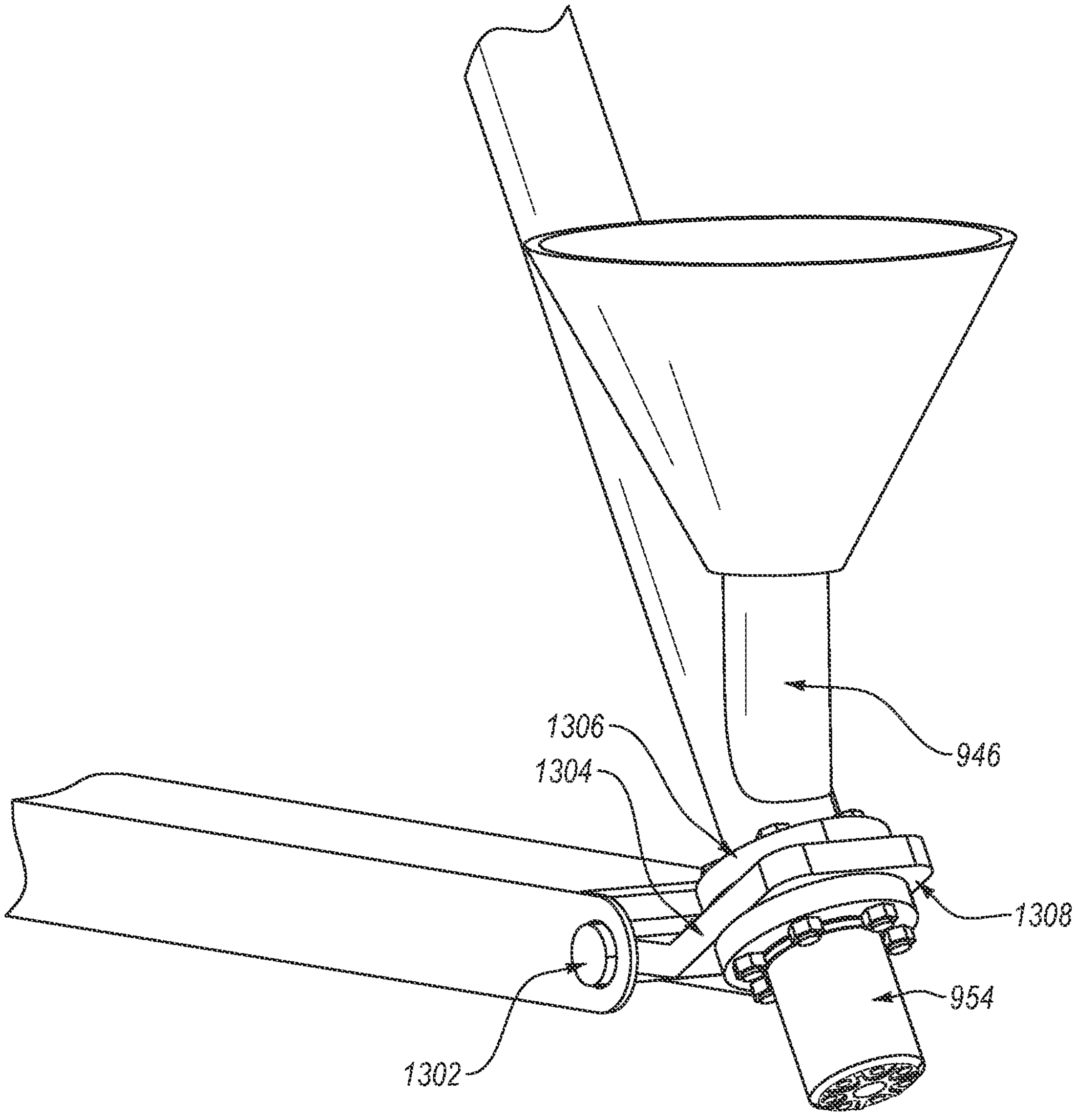
FIG. 13 is a pictorial illustration of a pivot point, flange, and motor of the concrete residue collection system shown in FIG. 9.

FIG. 13 provides a close-up view of a motor housing 954 and other components of the concrete residue collection system 900. In a non-limiting embodiment, the motor housing 954 houses a motor, such as motor 154, that is configured to power a rotating helical screw 1402, as shown in FIG. 14, that extends within an interior of the casing tube 946.

In a non-limiting embodiment, an angled steel or other metal plate 1304 having some thickness couples the motor housing 954 to the rotating helical screw 1402 contained within the casing tube 946. An additional circular steel or other metal plate 1306 may also be attached to a top side of the angled steel plate 1304. The motor housing 954 may be cylindrically shaped to encompass a motor 154 inside that couples to a lower end of the rotating helical screw 1402. The motor housing 954 may be bolted or otherwise fastened to the underside 1308 of the angled steel or other metal plate 1304. The angled plate 1304 is connected at a hinge 1302 to one end of the extension platform 1002 such that the casing tube 946 is hingedly connected to the extension platform 1002 via the angled plate 1304.

As noted above, FIG. 14 shows a partial interior view of the casing tube 946 with an interior view of the rotating helical screw 1402 extending within the interior of the casing tube 946. The second portion 1104 of the hydraulic cylinder 1004 as shown in FIG. 11 is also shown in FIG. 14, whereby the hydraulic cylinder 1004 is hydraulically enabled to extend at an angle and therefore to raise the casing tube 946.

The collection hopper 1006 is facing upwards such that the lower end of the interior funnel opening 1408 that is part of the collection outlet 1012 faces downwards, whereby the lower end of the funnel opening 1408 leads to the augur conveyor inlet 1404 and is visible in FIG. 14. In a non-limiting embodiment, the collection hopper 1006 of the concrete residue collection system 900 can be positioned beneath any pouring chutes of the concrete mixing truck 101 after the ready mix concrete 162 is delivered to a delivery site 102, as discussed above with respect to FIG. 1. In order to avoid putting extra burden on the customer, the operator of the concrete mixing truck 101 can wash the slurry aggregate 170, upon delivery of the ready mix concrete 162, using an attached hose 118 so that water flows down the pouring chutes (primary chutes and separately attached auxiliary chutes 130) and forces all of the slurry aggregate 170 to collect within the interior 1008 of the collection hopper 1006 and to travel down the funnel opening 1408 that leads to the augur conveyor inlet 1404, so that the slurry aggregate 170 can travel up the rotating helical screw 1402 that is powered on by the motor 154.

Figure 16:
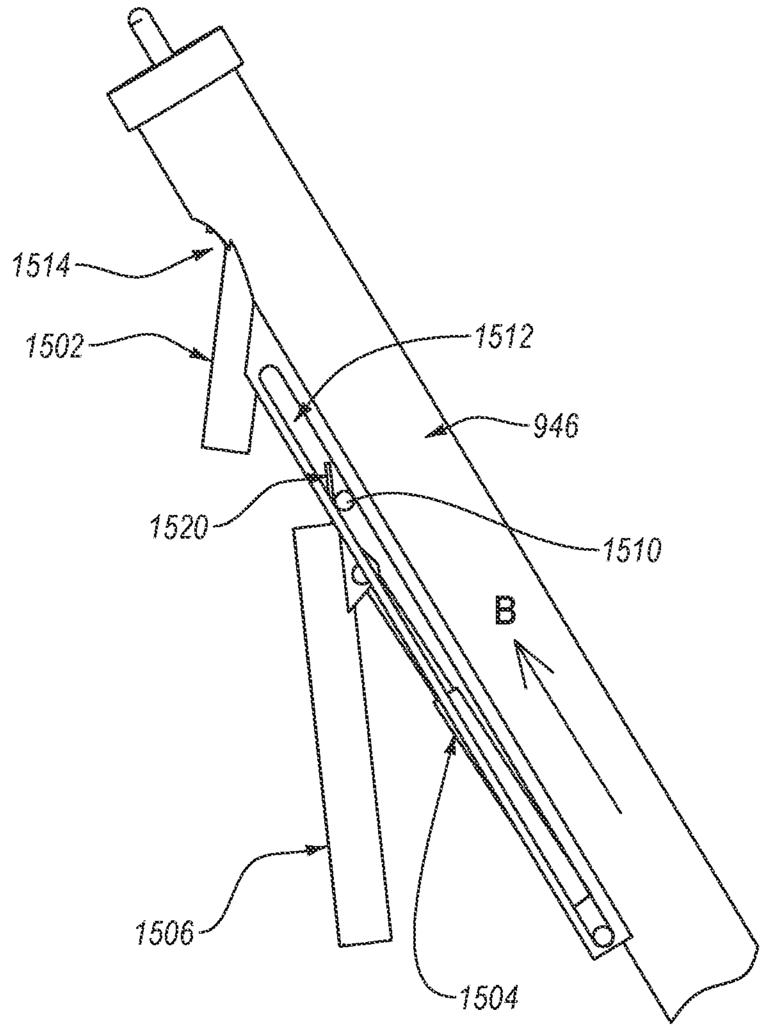
FIG. 16 is a pictorial illustration of the augur conveyor outlet shown in FIG. 15 in a first position.
Figure 17:
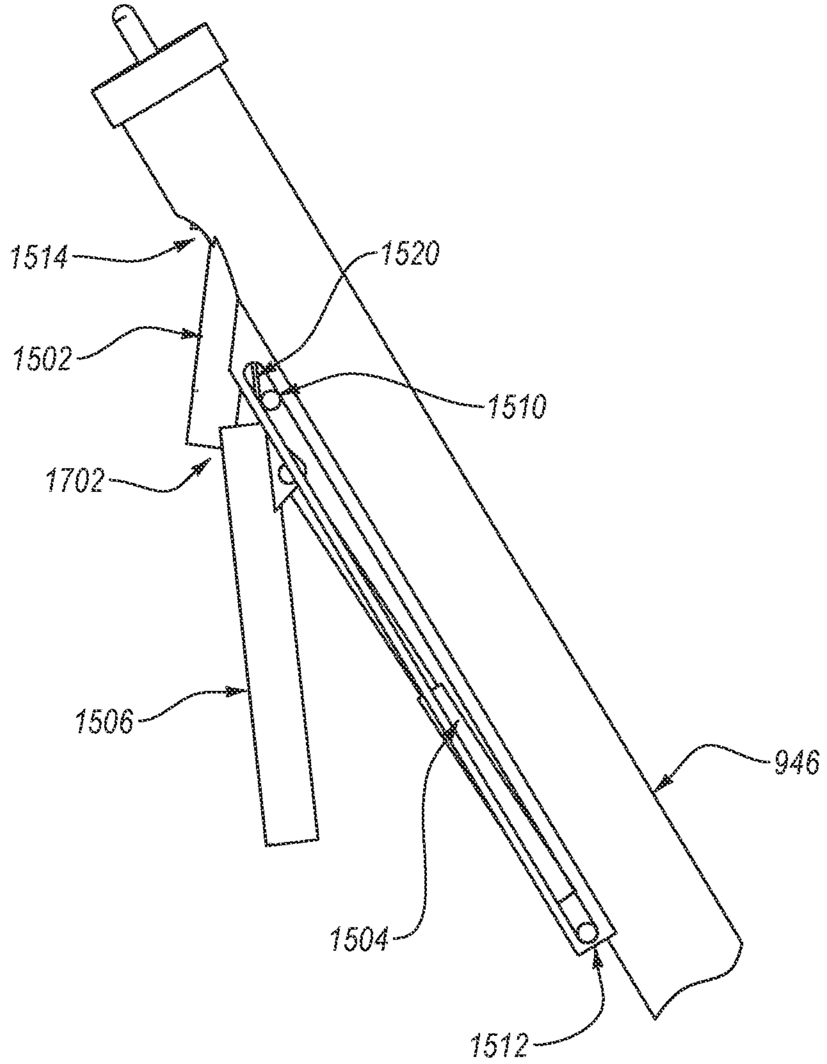
FIG. 17 is a pictorial illustration of the augur conveyor outlet shown in FIG. 15 in a second position.
Figure 18:
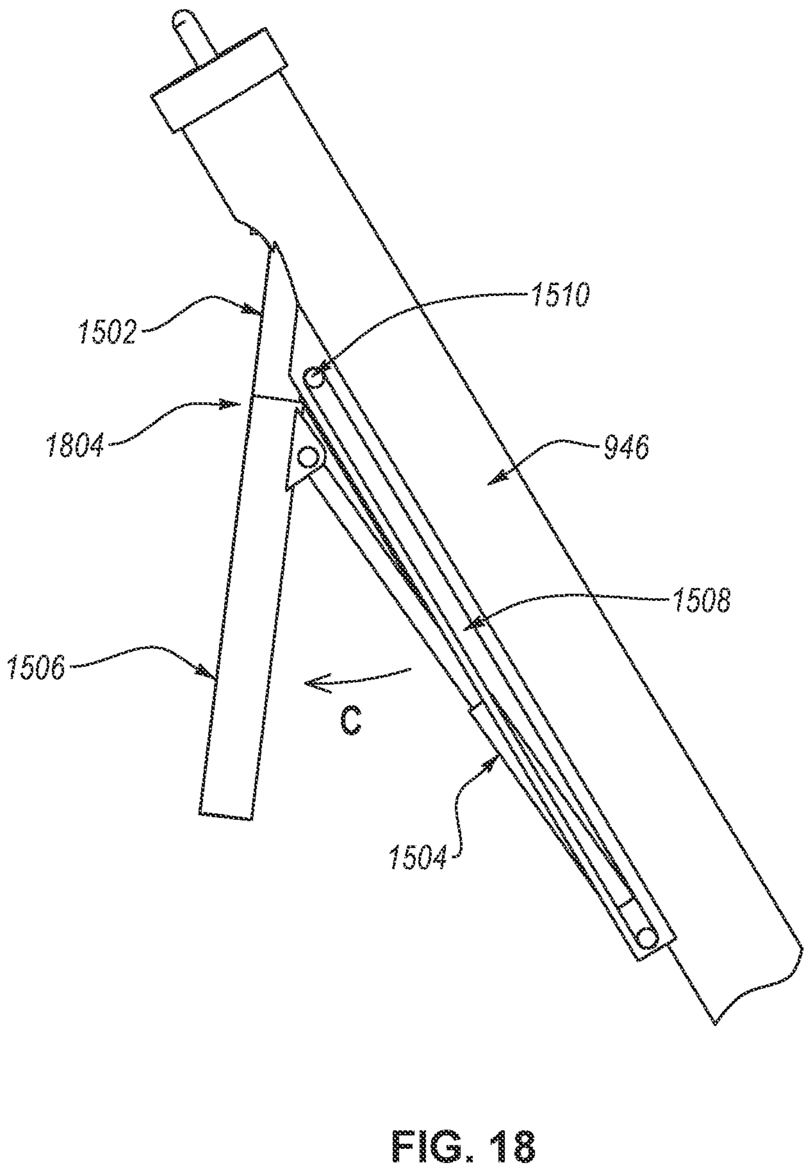
FIG. 18 is a pictorial illustration of the augur conveyor outlet shown in FIG. 15 in a third position.
Figure 19:
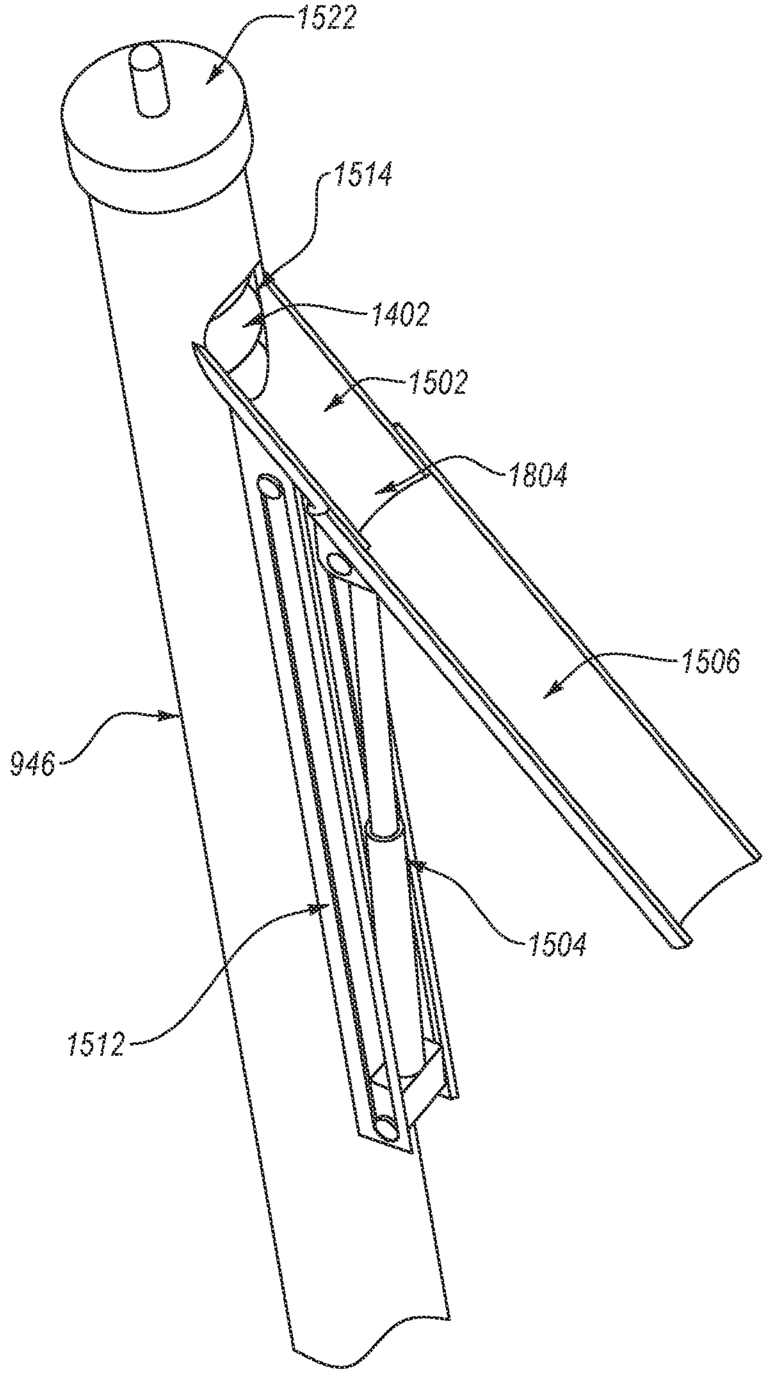
FIG. 19 is a pictorial illustration of a top perspective view of the augur conveyor outlet shown in FIG. 18 with a view of the interior rotating helical screw of the augur conveyor.
Figure 20:
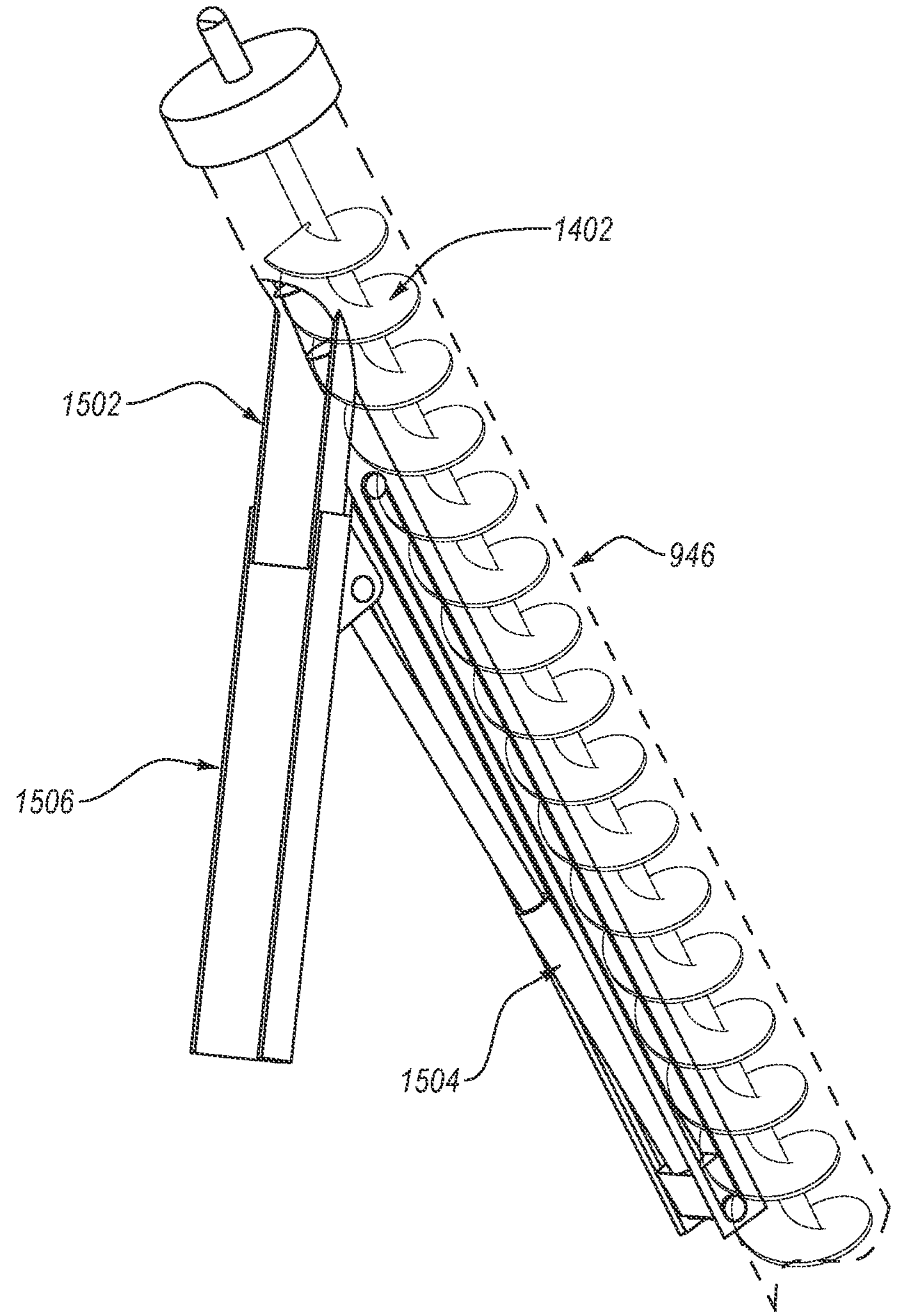
FIG. 20 is a pictorial illustration of a side view of the augur conveyor outlet shown in FIG. 15. and another interior view of the rotating helical screw of the augur conveyor.

FIGS. 15-20 show an exemplary, non-limiting embodiment of a discharge assembly 1500 that may be utilized to discharge the washed off slurry aggregate 170. In a non-limiting embodiment, the discharge assembly 1500 is located near a top 1522 of the casing tube 946. In a non-limiting embodiment, the discharge assembly 1500 is made up of a fixed half pipe 1502 and an articulating half pipe 1506. The fixed half pipe 1502 is formed in or otherwise integrated with an underside 1524 of the casing tube 946, and is positioned just beneath the augur conveyor outlet 1514, whereby any contents (i.e., slurry aggregate 170) moving up the rotating helical screw 1402 within the casing tube 946, moves through the casing tube 946 and out from the augur conveyor outlet 1514 and down the fixed half pipe 1502 and the articulating half pipe 1506, when the fixed half pipe 1502 and the articulating half pipe 1506 are joined as shown in FIGS. 18-20.

The articulating half pipe 1506 as shown in FIG. 15 is adapted to be separated from the fixed half pipe 1502 when in a non-operational, stored position. When the discharge assembly 1500 needs to be assembled and needs to be operational, the articulating half pipe 1502 may move towards the fixed half pipe 1502 and form a full pipe to provide a chute or conduit for any discharged slurry aggregate 170 to proceed through the top hopper 122 and return to the mixing drum 112 of the concrete mixing truck 101. Accordingly, FIG. 15 shows a first position of the discharge assembly 1500 whereby the articulating half pipe 1506 is not joined with the fixed half pipe 1502.

In a non-limiting embodiment, a slot and cam style system is utilized to cause the articulating half pipe 1506 to join with the fixed half pipe 1502 when the two are separated. As shown in FIG. 15, there may be a slot and cam housing 1512 having a slot 1508 that extends in a longitudinal direction within the slot and cam housing 1512. The slot and cam housing 1512 may be formed with or otherwise attached to an underside 1524 of the casing tube 946. The cam 1510 piece may be a movable sliding piece that connects to an extension linkage piece 1520 that connects through the slot and cam housing 1512 to the connected articulating half pipe 1506. One or more hydraulic cylinders 1504 is also integrated with the discharge assembly 1500 and with the slot and cam housing 1512. The hydraulic cylinders 1504 can be activated to begin movement of the sliding cam piece 1510 and extension linkage piece 1520 and connected articulating half pipe 1506 towards the fixed half pipe 1514. FIG. 16 shows arrow B indicating the direction of movement of the sliding cam piece 1510, extension linkage 1520, and connected articulating half pipe 1506 when the hydraulic cylinder 1504 is activated and begins moving towards the fixed half pipe 1502 in an operational mode. The cam 1510 and the extension linkage 1520 travel upwards in the direction of arrow B through the slot 1508 extending within the slot and cam housing 1512.

FIG. 17 shows that the cam 1510 and extension linkage 1520 continue sliding and moving in that direction towards the upper end of the slot 1508, which causes the articulating half pipe 1506 to move closer and closer to the fixed half pipe 1502, until the articulating half pipe 1506 makes contact at 1702 as shown in FIG. 17 with a lower end of the fixed half pipe 1502. As shown in FIG. 18, when the cam piece 1510 has slid all the way to the upper end of the slot and cam housing 1512 and can move no farther, the articulating half pipe 1506 is joined to the lower end of the fixed half pipe 1502 at joint 1804. It is noted that the articulating half pipe 1506 may have pivoted and rotated at a pivot angle indicated by arrow C shown in FIG. 18 to also form joint 1804 and join with the lower end of the fixed half pipe 1502.

Accordingly, the rotating helical screw 1402, which is partially visible in FIG. 19, when powered on by the motor 154 within the motor housing 954 can discharge any slurry aggregate 170 out of the augur conveyor outlet 1514 and down the length of the coupled fixed half pipe 1502 and articulating half pipe 1506 and straight into the top hopper 122 and mixing drum 112 of the concrete mixing truck 101. FIG. 20 shows an example of an interior of the casing tube 946 with the rotating helical screw 1402 and the joined discharge assembly 1500 that includes the slot and cam style system. When not in operational mode and in storage or transport mode, the hydraulic cylinder 1504 can be activated to retract, thereby pulling the cam 1510, extension linkage 1520, and connected articulating half pipe 1506 away from the fixed pipe 1502 until reaching the storage position shown in FIG. 15. This may enable all the components of the discharge assembly 1500 to be in storage mode and to not extend to far outwardly away from the casing tube 946, and to be stored easily within the protective housing 902 shown in FIG. 9.

Upon completion of reclamation of the slurry aggregate 170 within the mixing drum 112 of the concrete mixing truck 101, the concrete residue collection system 900 may be prepared by the operator to return to the original stored position. This may further include lowering the casing tube 946 of the augur conveyor 944 until the casing tube 946 is substantially horizontal and parallel to and/or contacting a top surface of the extension platform 1002. After lowering the casing tube 946 of the augur conveyor 944, the fully extended extension platform 1002 may be retracted in a horizontal direction towards the concrete mixing truck 101 and back into the interior cavity through the opening 904 of the protective housing 902. Once the operator is assured that the concrete residue collection system 900 is fully stored and retracted, then the operator of the concrete mixing truck 101 may drive the concrete mixing truck 101 and transport the reclaimed slurry aggregate 170 on the concrete mixing truck to another location for subsequent disposal or use and in an environmentally safe and responsible manner. One or more components of the protective housing 902, the augur conveyor 944, and discharge assembly 1500 may be controlled by one or more controls provided by the control system 156 as described above. Further, there may be one or more safety switches 158 as described above and shown in FIG. 1 to ensure safe use of one or more components of the protective housing 902, the augur conveyor 944, and discharge assembly 1500.

As noted above, there are many desirable advantages and benefits of the concrete residue collection system 140 as described in one or more non-limiting embodiments. Notably, the client or customer at the job delivery site 102 is not responsible for the cost and expense and effort that it takes to properly dispose of concrete slurry aggregate 170. Rather, the original supplier of the concrete who is already equipped with equipment and processes to dispose of concrete and slurry aggregate is able to reclaim these elements and dispose of them in a safe and environmentally responsible manner. Further, the concrete residue collection system 140 does not add an excessive amount of weight to a concrete mixing truck 101 and can be incorporated into existing truck designs. Many other advantages and benefits are provided by the concrete residue collection system 140.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may refer to a direct or indirection connection. The term "set" as used herein may refer to one or more items.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method, comprising:

extending a concrete residue collection system from a stored position to an extended position beneath any utilized pouring chutes of a concrete mixing truck, wherein the concrete residue collection system collects slurry aggregate from the concrete mixing truck, wherein the concrete residue collection system further comprises:
- a collection hopper;
- an augur conveyor connected to the collection hopper, the augur conveyor further comprising:
  - a casing tube having an augur conveyor inlet and an augur conveyor outlet;
  - a helical screw disposed within the casing tube of the augur conveyor, wherein the helical screw extends from the augur conveyor inlet to the augur conveyor outlet, wherein an outlet of the collection hopper leads to at least the augur conveyor within the casing tube;
  - an extension platform, wherein the collection hopper and connected augur conveyor are attached to the extension platform;
  - one or more hydraulic cylinders connecting the casing tube of the augur conveyor to the extension platform;
  - a motor housing that houses a motor;

when ready for operation and reclamation of the slurry aggregate by the concrete residue collection system, extending the extension platform in a horizontal direction away from the concrete mixing truck and raising the casing tube of the augur conveyor to a full height until the casing tube of the augur conveyor is raised to a maximum angle away from the extension platform and the augur conveyor outlet is positioned over a top hopper of the concrete mixing truck;

powering the helical screw to rotate within the casing tube of the augur conveyor in order to have a rotating helical screw within the casing tube that extends from the augur conveyor inlet to the augur conveyor outlet;

activating a water source and flushing any slurry aggregate collected on the any utilized pouring chutes of the concrete mixing truck into the collection hopper of the concrete residue collection system, wherein the slurry aggregate flowing off of the any utilized pouring chutes is directed through an interior cavity of the collection hopper and into the augur conveyor inlet located on a lower end of the casing tube;

flowing the slurry aggregate in an upwards direction upwardly through the casing tube by means of the rotating helical screw within the casing tube of the augur conveyor towards the augur conveyor outlet;

discharging the slurry aggregate from the augur conveyor outlet through a connected discharge pipe or tube or other discharge assembly into an inlet of the top hopper of the concrete mixing truck;

flowing the slurry aggregate from the connected discharge pipe or tube or other discharge assembly into the inlet of the top hopper of the concrete mixing truck and into a mixing drum of the concrete mixing truck;

upon completion of reclamation of the slurry aggregate within the mixing drum of the concrete mixing truck, preparing the concrete residue collection system to return to the stored position, further comprising:

lowering the casing tube of the augur conveyor until the casing tube is substantially horizontal and parallel to and/or contacting a top surface of the extension platform; and after lowering the casing tube of the augur conveyor, retracting the extended extension platform by retracting the extended extension platform in a horizontal direction towards the concrete mixing truck; and transporting the slurry aggregate on the concrete mixing truck to another location for subsequent disposal or use.

2. The method of claim 1, wherein extending the concrete residue collection system from the stored position to an extended position beneath any utilized pouring chutes of the concrete mixing truck, further comprises:

extending the concrete residue collection system so that the collection hopper attached to the extension platform is positioned beneath a lowermost chute of the any utilized pouring chutes and the casing tube of the augur conveyor is fully raised such that the augur conveyor outlet and connected discharge pipe or tube or other discharge assembly are positioned over an inlet of the top hopper of the concrete mixing truck.

3. The method of claim 1, wherein the any utilized pouring chutes comprises a primary chute and any auxiliary chutes that are separately attachable to the primary chute.

4. The method of claim 1, wherein extending the concrete residue collection system further comprises extending the concrete residue collection system to extend out of an opening of a protective housing that houses the concrete residue collection system in the stored position, wherein the protective housing is attached to a frame assembly of the concrete mixing truck.

5. The method of claim 1, wherein the discharge assembly coupled to the augur conveyor further has a stored position and a fully extended position, wherein extending the discharge assembly coupled to the augur conveyor to a fully extended position further comprises:

activating a hydraulic cylinder coupled to an articulating half pipe and cam, wherein the cam is positioned within a slot within a slot and cam housing, wherein the slot and cam housing is attached to an underside of the casing tube of the augur conveyor near an upper end of the casing tube;

upon activation of the hydraulic cylinder, moving the cam in an upwards direction through the slot of the slot and cam housing, thereby moving the articulating half pipe in an upwards direction towards a fixed half pipe connected to an upper end of the slot and cam housing; and when the cam reaches a final stop position at an upper end of the slot and cam housing, positioning the articulating half pipe such that a top end of the articulating half pipe contacts a lower end of the fixed half pipe, wherein any slurry aggregate discharged from the augur conveyor outlet via the helical screw that can rotate is discharged into the fixed half pipe and connected articulating half pipe into the inlet of the top hopper and then into the mixing drum.

6. The method of claim 1, wherein the concrete mixing truck is a rear discharge mixing truck, wherein when in use to collect the slurry aggregate, the concrete residue collection system is extended behind a rear of the rear discharge mixing truck when in an extended position.

7. The method of claim 1, wherein the concrete mixing truck is a forward discharge mixing truck, wherein when in use to collect the slurry aggregate, the concrete residue collection system is extended in front of a cab of the concrete mixing truck and in front of the forward discharge mixing truck when in an extended position.

8. The method of claim 1, wherein the one or more hydraulic cylinders connecting the casing tube of the augur conveyor to the extension platform is hydraulically powered using water from a hydraulic system included on the concrete mixing truck.

9. The method of claim 1, wherein the slurry aggregate is transported from a delivery site to the production site after the slurry aggregate is collected from the delivery site using the concrete residue collection system and can be disposed of in a safe, environmentally responsible manner.

* * * * *